United States Patent
Yoo et al.

(10) Patent No.: US 11,747,946 B2
(45) Date of Patent: Sep. 5, 2023

(54) DISPLAY DEVICE AND TOUCH INPUT SYSTEM INCLUDING THE SAME

(71) Applicant: SAMSUNG DISPLAY CO., LTD., Yongin-si (KR)

(72) Inventors: Gi Na Yoo, Cheonan-si (KR); Ju Yeon Kim, Asan-si (KR)

(73) Assignee: SAMSUNG DISPLAY CO., LTD, Yongin-si (KR)

( * ) Notice: Subject to any disclaimer, the term of this patent is extended or adjusted under 35 U.S.C. 154(b) by 0 days.

(21) Appl. No.: 17/820,498

(22) Filed: Aug. 17, 2022

(65) Prior Publication Data
US 2023/0229274 A1      Jul. 20, 2023

(30) Foreign Application Priority Data
Jan. 19, 2022   (KR) .................. 10-2022-0007689

(51) Int. Cl.
  *G06F 3/044*   (2006.01)
  *G02F 1/1333*   (2006.01)
  *G06F 3/041*   (2006.01)

(52) U.S. Cl.
  CPC ........ *G06F 3/0445* (2019.05); *G02F 1/13338* (2013.01); *G06F 3/0412* (2013.01)

(58) Field of Classification Search
CPC ... G06F 3/0445; G06F 3/0412; G02F 1/13338
See application file for complete search history.

(56) References Cited

U.S. PATENT DOCUMENTS

| | | | |
|---|---|---|---|
| 6,548,768 B1 | 4/2003 | Nomura et al. | |
| 10,429,950 B2 | 10/2019 | Thomas et al. | |
| 2018/0224984 A1* | 8/2018 | Kim | G06F 3/0443 |
| 2020/0133414 A1* | 4/2020 | Lee | G06F 3/04164 |

* cited by examiner

*Primary Examiner* — Deeprose Subedi
(74) *Attorney, Agent, or Firm* — F. CHAU & ASSOCIATES, LLC

(57) ABSTRACT

A display device comprising a display unit that includes a plurality of light emitting areas; a plurality of touch electrodes that sense a touch and that are disposed between the plurality of light emitting areas; a plurality of code patterns that cover a portion of a front surface of at least one of the plurality of touch electrodes with a preset code shape; and an infrared scattering layer disposed on the plurality of touch electrodes and the plurality of code patterns according to an arrangement shape of the plurality of touch electrodes. The infrared scattering layer scatters infrared light incident on or reflected from the plurality of code patterns and the plurality of touch electrodes.

20 Claims, 20 Drawing Sheets

DISPLAY DEVICE AND TOUCH INPUT SYSTEM INCLUDING THE SAME

CROSS-REFERENCE TO RELATED APPLICATION

This application claims priority under 35 U.S.C. 119 from Korean Patent Application No. 10-2022-0007689, filed on Jan. 19, 2022 in the Korean Intellectual Property Office, the contents of which are herein incorporated by reference in their entirety.

TECHNICAL FIELD

Embodiments of the present disclosure are directed to a display device and a touch input system including the same.

DISCUSSION OF THE RELATED ART

Display devices have been incorporated into various electronic devices, such as smartphones, digital cameras, laptop computers, navigation devices, and smart televisions. A display device may be a flat panel display device such as a liquid crystal display device, a field emission display device, or an organic light emitting display device. Among the flat panel display devices, a light emitting display device includes a light emitting element in which each pixel of a display panel emits light by itself, thereby displaying an image without a backlight unit that provides light to the display panel.

Many recent display devices support a touch input from a portion of a user's body, such as a finger, and a touch input from an electronic pen. By sensing the touch input from an electronic pen, a display device can more precisely sense the touch input than when only sensing the touch input from a portion of the user's body.

SUMMARY

Embodiments of the present disclosure provide a display device that senses a touch input from a touch input device using code patterns of a display panel, and a touch input system that includes the same.

Embodiments of the present disclosure provide a display device with an improved recognition rate of code patterns that are formed of an infrared blocking material by reducing specular reflectivity of infrared light by a display panel, and a touch input system including the same.

According to an embodiment of the disclosure, a display device comprises a display unit that includes a plurality of light emitting areas; a plurality of touch electrodes that sense a touch and are disposed between the plurality of light emitting areas; a plurality of code patterns that cover a portion of a front surface of at least one of the plurality of touch electrodes with a preset code shape; and an infrared scattering layer disposed on the plurality of touch electrodes and the plurality of code patterns according to an arrangement shape of the plurality of touch electrodes. The infrared scattering layer scatters infrared light incident on or reflected from the plurality of code patterns and the plurality of touch electrodes.

In an embodiment, the plurality of touch electrodes include a plurality of driving electrodes, a plurality of sensing electrodes, and a plurality of dummy electrodes. The plurality of driving electrodes, the plurality of sensing electrodes, and the plurality of dummy electrodes have a mesh structure that surrounds the plurality of light emitting areas.

In an embodiment, the plurality of code patterns have a planar shape that is one of a closed loop shape of at least one of a rectangle, a square, a circle, or a rhombus, an open loop shape that partially surrounds at least one of the plurality of light emitting areas, or a straight line shape that has a preset length.

In an embodiment, the plurality of code patterns include an inorganic or organic black pigment that absorbs infrared light, and cover a portion of a front surface and a portion of a side surface of at least one of the plurality of touch electrodes.

In an embodiment, the infrared scattering layer has a straight or curved pattern shape that covers front and side surfaces of the plurality of touch electrodes and the plurality of code patterns, or has an open loop shape that partially surrounds at least one light emitting area of the plurality of light emitting areas.

In an embodiment, the infrared scattering layer has a mesh shape that covers front and side surfaces of the plurality of touch electrodes and the plurality of code patterns according to a planar arrangement shape of the plurality of touch electrodes.

In an embodiment, the infrared scattering layer has a planar shape that covers all of the plurality of touch electrodes, the plurality of code patterns, and the plurality of light emitting areas.

In an embodiment, the plurality of light emitting areas emit first to third colors, and the infrared scattering layer covers the plurality of touch electrodes, the plurality of code patterns, and light emitting areas that emit second and third colors of the plurality of light emitting areas.

In an embodiment, the plurality of light emitting areas emit first to third colors, and the infrared scattering layer covers the plurality of touch electrodes, the plurality of code patterns, and a light emitting area that emits a third color of the plurality of light emitting areas.

In an embodiment, the plurality of light emitting areas emit first to fourth colors, and the infrared scattering layer covers the plurality of touch electrodes, the plurality of code patterns, and light emitting areas that emit second to fourth colors of the plurality of light emitting areas.

In an embodiment, the plurality of light emitting areas emit first to fourth colors, and the infrared scattering layer covers the plurality of touch electrodes, the plurality of code patterns, and light emitting areas that emit third and fourth colors of the plurality of light emitting areas.

In an embodiment, the infrared scattering layer is formed of an organic or inorganic material that includes a plurality of infrared scatterers, and the infrared scatterers include particles that have a size that transmits light of a preset visible light wavelength band and reflects and scatters light of a preset infrared wavelength band according to an experimental value.

In an embodiment, the infrared scattering layer includes spherical and elliptical metal nanoparticles whose diameters are configured to reflect and scatter light of the preset infrared wavelength band.

In an embodiment, the infrared scattering layer includes spherical and elliptical metal nanoparticles whose diameters are configured to scatter light of the preset infrared wavelength band and transmit light of the preset visible light wavelength band.

In an embodiment, the infrared scattering layer further includes rod-shaped metal nanoparticles whose length-to-width ratio is configured to scatter light of the preset infrared wavelength band.

According to an embodiment of the disclosure, a touch input system comprises a display device that displays an image; and a touch input device that inputs a touch to the display device. The display device includes a display unit that includes a plurality of light emitting areas; a plurality of touch electrodes that sense a touch are disposed between the plurality of light emitting areas; and a plurality of code patterns that cover a portion of a front surface of at least one of the plurality of touch electrodes with a preset code shape. The touch input device includes a code detection unit that senses the plurality of code patterns; and a code processor that receives shape data for the plurality of code patterns and extracts data codes that correspond to shapes of the plurality of code patterns, and that generates coordinate data that correspond to the data codes.

In an embodiment, the display device includes an infrared scattering layer disposed on the plurality of touch electrodes including the plurality of code patterns according to an arrangement shape of the plurality of touch electrodes to scatter infrared light incident on or reflected from the plurality of code patterns and the plurality of touch electrodes; and the touch input device includes a communication module that transmits the coordinate data to the display device.

In an embodiment, the plurality of touch electrodes include a plurality of driving electrodes, a plurality of sensing electrodes, and a plurality of dummy electrodes, and the plurality of driving electrodes, the plurality of sensing electrodes, and the plurality of dummy electrodes have a mesh structure that surrounds the plurality of light emitting areas.

In an embodiment, the infrared scattering layer has a mesh shape that covers front and side surfaces of the plurality of touch electrodes and the plurality of code patterns according to a planar arrangement shape of the plurality of touch electrodes.

In an embodiment, the plurality of light emitting areas include first to third light emitting areas that respectively emit first to third colors, or first to fourth light emitting areas that respectively emit first to fourth colors, and the infrared scattering layer covers the plurality of touch electrodes, the plurality of code patterns, and at least one light emitting area of the first to third light emitting areas or the first to fourth light emitting areas.

According to a display device and a touch input system that includes the same according to embodiments of the present disclosure, by using code patterns of the display panel without complicated calculations and corrections, touch coordinate data of the touch input device can be generated, and a touch input of the touch input device can be performed. In particular, accurate input coordinates of a touch input can be determined, cost can be reduced, power consumption can be reduced, and a driving process can be simplified.

In addition, according to a display device and a touch input system including the same according to embodiments, a recognition rate of code patterns formed by the infrared blocking material is increased by reducing a infrared specular reflectivity of the display panel.

In addition, as an infrared scattering layer is formed on touch electrodes of the display panel and at least one pixel area, infrared reflectivity of the display panel is reduced. Accordingly, a recognition rate and accuracy of code patterns and code information is increased.

DETAILED DESCRIPTION

Embodiments of the present disclosure will now be described more fully hereinafter with reference to the accompanying drawings, in which embodiments of the disclosure are shown.

It will also be understood that when a layer is referred to as being "on" another layer or substrate, it can be directly on the other layer or substrate, or intervening layers may also be present. The same reference numbers may indicate the same components throughout the specification.

Hereinafter, embodiments will be described with reference to the accompanying drawings.

Figure 1:
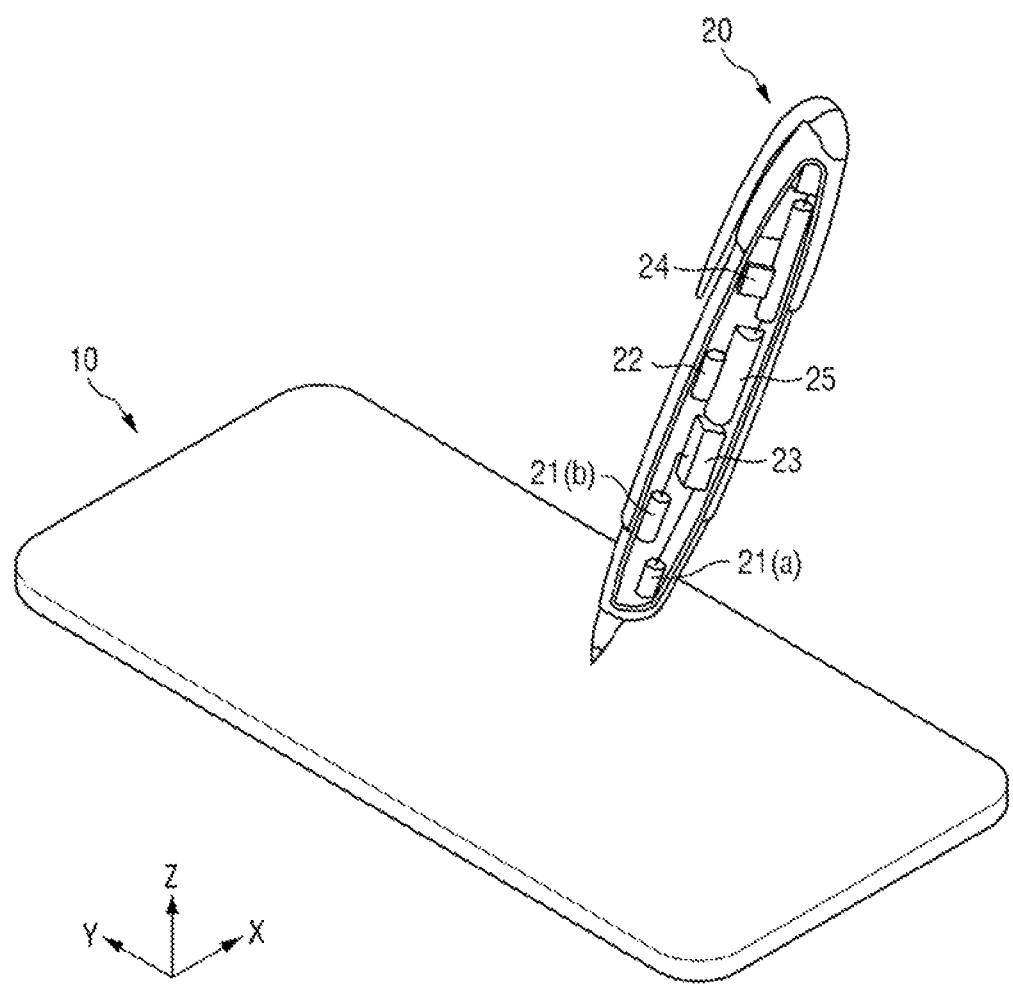
FIG. 1 illustrates a touch input system according to an embodiment of the present disclosure.
Figure 2:
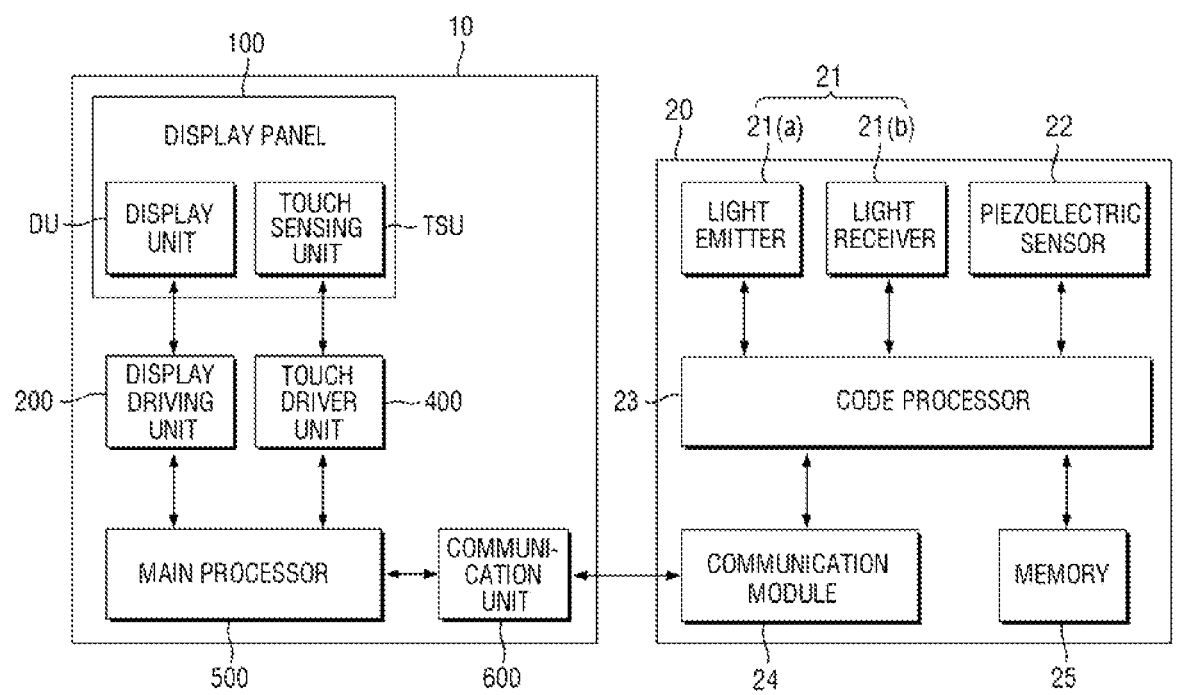
FIG. 2 is a block diagram of a touch input device and a display device illustrated in FIG. 1.

FIG. 1 illustrates a touch input system according to an embodiment of the present disclosure. FIG. 2 is a block diagram of a touch input device and a display device illustrated in FIG. 1.

Referring to FIGS. 1 and 2, in an embodiment, a display device 10 can be incorporated into portable electronic devices such as mobile phones, smartphones, tablet personal computers (PCs), mobile communication terminals, electronic notebooks, electronic books, portable multimedia players (PMPs), navigation devices, and ultra mobile PCs (UMPCs). For example, the display device 10 may be a display unit of a television, a laptop computer, a monitor, a billboard, or an Internet of Things (IOT) device. For another example, the display device 10 can be incorporated into wearable devices such as smart watches, watch phones, glasses-type displays, and head mounted displays (HMDs).

The display device 10 includes a display panel 100, a display driving unit (a driving circuit) 200, a touch driving unit (a driving circuit) 400, a main processor (a processing circuit) 500, and a communication unit (a communications circuit) 600. In addition, a touch input device 20 includes a code detection unit (a detection circuit) 21, a piezoelectric sensor (a sensing circuit) 22, a code processor (a processing circuit) 23, a communication module (a communications circuit) 24, and a memory (a memory circuit) 25.

The display device 10 uses the touch input device 20 as a touch input mechanism. The display panel 100 of the display device 10 includes a display unit (a display circuit) DU that displays an image, and a touch sensing unit (a sensing circuit) TSU that senses an input from a human body part such as a finger and the touch input device 20.

The display unit DU of the display panel 100 includes a plurality of pixels and displays an image through the plurality of pixels. The touch sensing unit TSU of the display panel 100 is formed on a front surface of the display panel 100. The touch sensing unit TSU includes a plurality of touch electrodes that capacitively sense a user's touch. Since code patterns are formed on some of the plurality of touch electrodes, the code patterns are sensed by the touch input device 20.

The code patterns of the display panel 100 include a light blocking member that forms a preset position code by covering some of the plurality of touch electrodes with a preset planar code shape. Accordingly, the code patterns are sensed by the touch input device 20 according to the planar code shape of the light blocking member and a size of a planar code. In addition, an infrared scattering layer that reduces infrared specular reflectivity by scattering infrared light is formed on front surfaces of the plurality of touch electrodes.

The code patterns are formed of a light blocking member made of a material that absorbs and blocks infrared light, and the touch input device 20 recognizes the code patterns by transmitting infrared light to the display panel 100 and detecting infrared light reflected from the display panel 100 and the code patterns. Accordingly, the touch input device 20 senses code shapes of the code patterns by recognizing the width, size, and length of the code patterns from a small amount of infrared light reflected from a front surface of the display panel 100. However, when infrared light reflected from the front surface of the display panel 100 is increased and saturated by externally incident light, image display light of the display panel 100, light reflected from touch electrodes, etc., the code pattern recognition rate and accuracy of the touch input device 20 can be reduced. Since the touch input device 20 detects the code patterns using the small amount of infrared light that is reflected from the front surface of the display panel 100, detection failure due to infrared saturation, etc., can be prevented when an infrared scattering layer that reduces infrared specular reflectivity is formed on the front surfaces of the plurality of touch electrodes and the code patterns. For example, the infrared scattering layer covers the front surfaces of the code patterns and the touch electrodes to reduce infrared reflection characteristics and reflectivity from the code patterns and the touch electrodes. Accordingly, infrared saturation failure can be reduced through the code patterns and the touch electrodes and the recognition rate and accuracy of the code patterns of the touch input device 20 can be increased. In addition, to further reduce an influence of increased infrared light due to the reflected external light and image display light, the infrared scattering layer is formed on the front surfaces of the pixel areas as well as the touch electrodes. The infrared scattering layer formed on the pixel areas minimizes an influence of transmitted visible light while scattering infrared light, so that the influence on an image display quality may also be minimized. The formation structures of the code patterns and the infrared scattering layer as well as the touch sensing unit TSU of the display panel 100 as described above will be described below in more detail with reference to the accompanying drawings.

The display driving unit 200 outputs signals and voltages that drive the display unit DU. The display driving unit 200 supplies data voltages to data lines. The display driving unit 200 supplies a power voltage to a power line and supplies gate control signals to a gate driving unit.

The touch driving unit 400 is connected to the touch sensing unit TSU. The touch driving unit 400 supplies a touch driving signal to a plurality of touch electrodes of the touch sensing unit TSU, and senses an amount of capacitance change between the plurality of touch electrodes. The touch driving unit 400 calculates whether a user's touch input has occurred and touch coordinates based on the amount of capacitance change between the plurality of touch electrodes.

The main processor 500 controls all functions of the display device 10. For example, the main processor 500 supplies digital video data to the display driving unit 200 so that the display panel 100 displays an image. For example, the main processor 500 receives touch data from the touch driving unit 400 to determine the user's touch coordinates, then generates digital video data according to the touch coordinates or executes an application indicated by an icon displayed at the user's touch coordinates. For another example, the main processor 500 receives coordinate data from the touch input device 20 to determine the touch coordinates of the touch input device 20, then generates digital video data according to the touch coordinates or executes an application indicated by an icon displayed on the touch coordinates of the touch input device 20.

The communication unit 600 performs wired/wireless communication with an external device. For example, the communication unit 600 transmits and receives communication signals to and from the communication module 24 of the touch input device 20. The communication unit 600 receives coordinate data composed of data codes from the touch input device 20, and provides the coordinate data to the main processor 500.

The touch input device 20 can be used as a touch input mechanism and is configured as an electronic pen such as a smart pen. The electronic pen of the touch input device 20 optically senses display light of the display panel 100 or light reflected from the display panel 100, and detects a code pattern in the display panel 100 based on the sensed light and generates the coordinate data. The electronic pen of the touch input device 20 has a shape of a writing instrument, but is not necessarily limited to the shape or structure of a writing instrument.

The code detection unit 21 of the touch input device 20 is disposed adjacent to a pen tip of the touch input device 20 to detect code patterns in the display panel 100. The code detection unit 21 includes at least one light emitting unit 21(*a*) that emits infrared light using at least one infrared light source, and at least one light receiving unit 21(*b*) that detects infrared light reflected from the code patterns with an infrared camera.

At least one infrared light source in the light emitting unit 21(*a*) is configured as an infrared LED array that has a matrix structure. In addition, the infrared camera of the light receiving unit 21(*b*) includes a filter that blocks wavelength bands other than infrared light and allows the infrared light to pass therethrough, a lens system that focuses infrared light that has passed through the filter, and an optical image sensor that converts an optical image formed by the lens system into an electrical image signal and outputs the converted image signal. Like the infrared LED array, the optical image sensor is configured as an array that has a matrix structure to provide shape data of the code patterns to the code processor 23 according to an infrared shape reflected from the code patterns. In this way, the code detection unit 21 of the touch input device 20 can continuously detect the code patterns in some areas of the touch sensing unit TSU according to the user's control and movement, and can continuously generate the shape data of the code patterns to provide the generated shape data to the code processor 23.

The code processor 23 continuously receives the shape data of the code patterns from the code detection unit 21. For example, the code processor 23 continuously receives the shape data for the code patterns, and identifies the arrangement structure and shape of the code patterns. The code processor 23 extracts or generates data codes that correspond to the arrangement structure and shape of the code patterns, and extracts or generates coordinate data that correspond to the data code by combining the data codes. The code processor 23 transmits the generated coordinate data to the display device 10 through the communication module 24. In particular, the code processor 23 receives the shape data of the code pattern unit and generates and converts the data codes that correspond to the code patterns, respectively, thereby quickly generating the coordinate data without a complicated calculation and correction.

The communication module 24 performs wired/wireless communication with an external device. For example, the communication module 24 transmits and receives communication signals to and from the communication unit 600 of the display device 10. The communication module 24 receives the coordinate data composed of the data codes from the code processor 23, and provides the coordinate data to the communication unit 600.

The memory 25 stores data that drives the touch input device 20. The memory 25 stores shape data of the code patterns and data codes that correspond to the respective shape data and code patterns, respectively. In addition, the memory 25 stores data codes and coordinate data according to a combination of data codes. The memory 25 shares with the code processor 23 the data codes that correspond to the respective shape data and code patterns, respectively, and the coordinate data according to the combination of the data codes. Accordingly, the code processor 23 combines the data codes and the coordinate data stored in the memory 25, and extracts or generates coordinate data that correspond to the combined data code.

Figure 3:
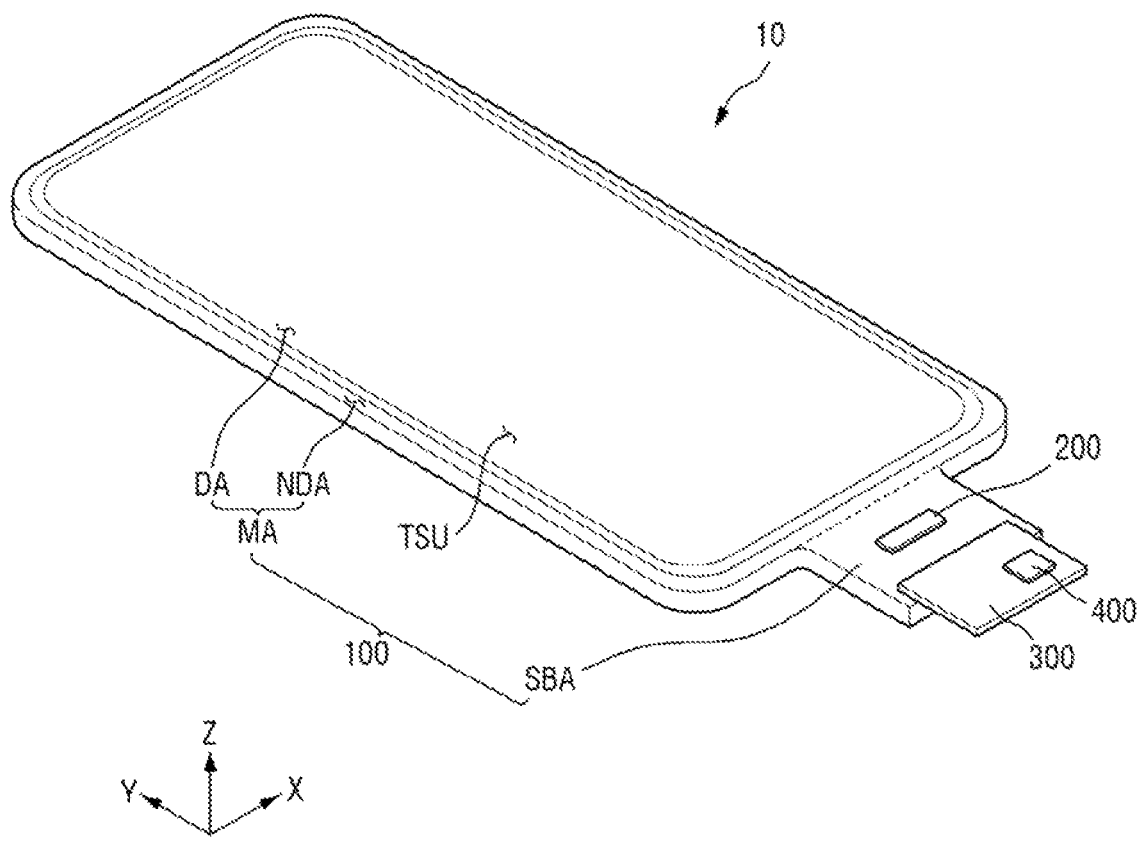
FIG. 3 is a perspective view of a display device illustrated in FIG. 2.

FIG. 3 is a perspective view of a display device illustrated in FIG. 2. In addition, FIG. 4 is a cross-sectional view of a display device illustrated in FIG. 2.

Figure 4:
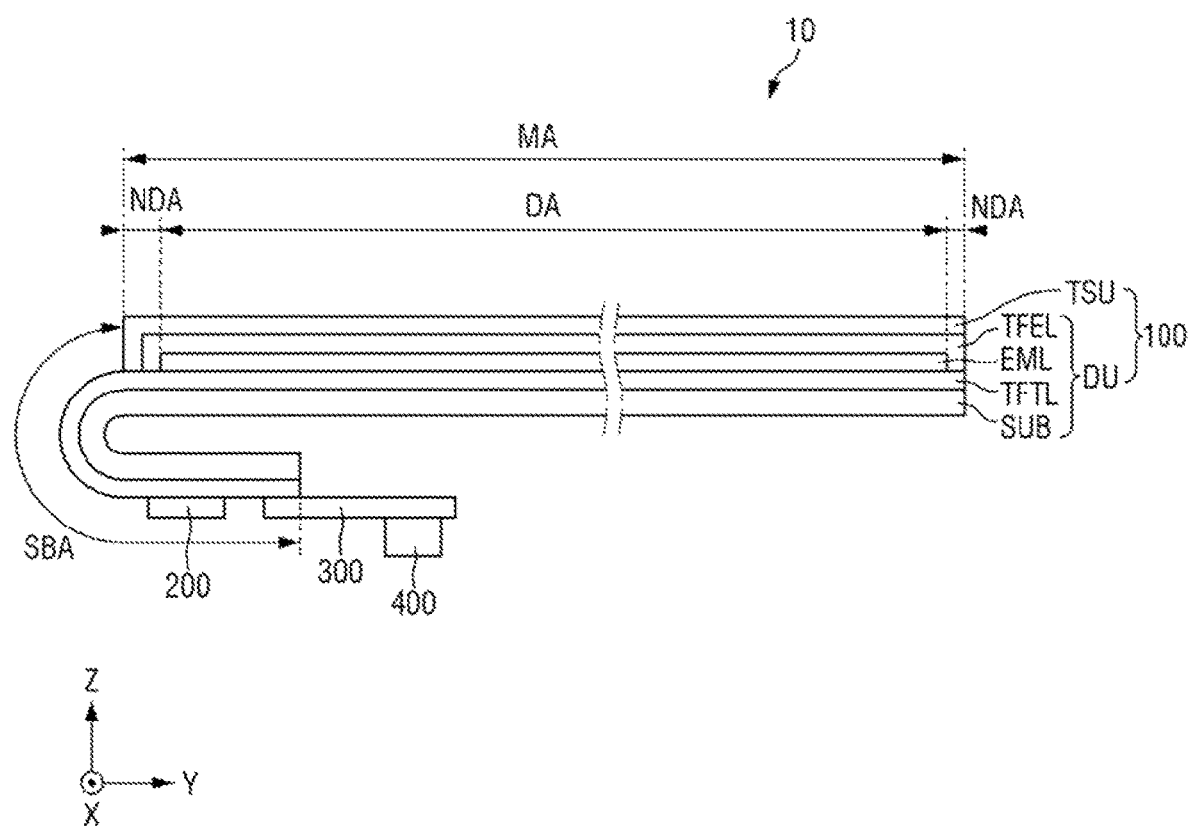
FIG. 4 is a cross-sectional view of a display device illustrated in FIG. 2.

Referring to FIGS. 3 and 4, in an embodiment, the display device 10 has a planar shape similar to a rectangle. For example, the display device 10 has a planar shape similar to a rectangle that has a short side in an X-axis direction and a long side in a Y-axis direction. A corner where the short side in the X-axis direction and the long side in the Y-axis direction meet may be rounded with a predetermined curvature or may be formed at a right angle. The planar shape of the display device 10 is not limited to a rectangle, and may be formed similar to other shapes, such as polygons, circles, or ovals.

The display panel 100 includes a main area MA and a sub-area SBA.

The main area MA includes a display area DA that includes pixels that display an image, and a non-display area NDA disposed around the display area DA. The display area DA emits light from a plurality of light emitting areas or a plurality of open areas. For example, the display panel 100 includes a pixel circuit that includes switching elements, a pixel defining layer that defines a light emitting area or an open area, and a self-light emitting element.

The non-display area NDA is outside the display area DA. The non-display area NDA is an edge area of the main area MA of the display panel 100. The non-display area NDA includes a gate driving unit that supplies gate signals to the gate lines, and fan-out lines that connect the display driving unit 200 and the display area DA.

The sub-area SBA extends from one side of the main area MA. The sub-area SBA includes a flexible material that can be bent, folded, rolled, etc. For example, when the sub-area SBA is bent, the sub-area SBA overlaps the main area MA in a thickness direction (Z-axis direction). The sub-area SBA includes the display driving unit 200 and a pad portion connected to a circuit board 300. In an embodiment, the sub-area SBA is omitted, and the display driving unit 200 and the pad portion are disposed in the non-display area NDA.

The display driving unit 200 is an integrated circuit (IC) and is mounted on the display panel 100 by one of a chip on glass (COG) method, a chip on plastic (COP) method, or an ultrasonic bonding method. For example, the display driving unit 200 is disposed in the sub-area SBA, and overlaps the main area MA in the thickness direction (Z-axis direction) when the sub-area SBA is bent. For another example, the display driving unit 200 is mounted on the circuit board 300.

The circuit board 300 is attached to the pad portion of the display panel 100 using an anisotropic conductive film (ACF). Lead lines of the circuit board 300 are electrically connected to the pad portion of the display panel 100. The circuit board 300 may be a flexible film such as a flexible printed circuit board, a printed circuit board, or a chip on film.

The touch driving unit 400 is mounted on the circuit board 300. The touch driving unit 400 is an integrated circuit (IC). As described above, the touch driving unit 400 supplies the touch driving signal to the plurality of touch electrodes of the touch sensing unit TSU, and senses the amount of capacitance change between the plurality of touch electrodes. The touch driving signal is a pulse signal having a predetermined frequency. The touch driving unit 400 calculates whether a touch input of a user's body part, such as a finger, has occurred and touch coordinates based on the amount of capacitance change between the plurality of touch electrodes.

Referring to FIG. 4, in an embodiment, the display panel 100 includes a display unit (a display circuit) DU, a touch sensing unit (a sensing circuit) TSU, and a polarizing film.

The display unit DU may include a substrate SUB, a thin film transistor layer (a transistor circuit) TFTL, a light emitting element layer (a light emitting circuit) EML, and an encapsulation layer TFEL.

The substrate SUB is a base substrate or a base member. The substrate SUB is a flexible substrate that can be bent, folded, and rolled. For example, the substrate SUB includes a glass or a metal, but is not necessarily limited thereto. In an embodiment, the substrate SUB includes a polymer resin such as polyimide PI.

The thin film transistor layer TFTL is disposed on the substrate SUB. The thin film transistor layer TFTL includes a plurality of thin film transistors that constitute a pixel circuit of pixels. The thin film transistor layer TFTL further includes gate lines, data lines, power lines, gate control lines, fan-out lines that connect the display driving unit 200 and the data lines, and lead lines that connect the display driving unit 200 and the pad portion. When the gate driving unit is formed on one side of the non-display area NDA of the display panel 100, the gate driving unit also includes the thin film transistors.

The thin film transistor layer TFTL is disposed in the display area DA, the non-display area NDA, and the sub-area SBA. The thin film transistors, the gate lines, the data lines, and the power lines of each of the pixels of the thin film transistor layer TFTL are disposed in the display area DA. The gate control lines and the fan-out lines of the thin film transistor layer TFTL are disposed in the non-display area NDA. The lead lines of the thin film transistor layer TFTL are disposed in the sub-area SBA.

The light emitting element layer EML is disposed on the thin film transistor layer TFTL. The light emitting element layer EML includes a plurality of light emitting elements in which a first electrode, a light emitting layer, and a second electrode are sequentially stacked to emit light, and a pixel defining layer that defines the pixels. The plurality of light emitting elements of the light emitting element layer EML are disposed in the display area DA. The light emitting layer is an organic light emitting layer that includes an organic material. The light emitting layer includes a hole transporting layer, an organic light emitting layer, and an electron transporting layer. When the first electrode receives a predetermined voltage through the thin film transistor of the thin film transistor layer TFTL, and the second electrode receives a cathode voltage, holes and electrons move through the hole transporting layer and the electron transporting layer, respectively, to the organic light emitting layer and combine with each other in the organic light emitting layer to emit light. For example, the first electrode is an anode electrode and the second electrode is a cathode electrode, but embodiments are not necessarily limited thereto.

In an embodiment, the plurality of light emitting elements include one of a quantum dot light emitting diode that includes a quantum dot light emitting layer or an inorganic light emitting diode that includes an inorganic semiconductor.

The encapsulation layer TFEL covers a top surface and side surfaces of the light emitting element layer EML, and protects the light emitting element layer EML. The encapsulation layer TFEL includes at least one inorganic layer and at least one organic layer that encapsulate the light emitting element layer EML.

The touch sensing unit TSU is disposed on the encapsulation layer TFEL. The touch sensing unit TSU includes a plurality of touch electrodes that capacitively sense a user's touch, and touch lines that connect the plurality of touch electrodes and the touch driving unit 400. For example, the touch sensing unit TSU senses a user's touch by either self-capacitance or mutual capacitance.

In an embodiment, the touch sensing unit TSU is disposed on a separate substrate disposed on the display unit DU. The substrate that supports the touch sensing unit TSU is a base member that encapsulates the display unit DU.

The plurality of touch electrodes of the touch sensing unit TSU are disposed in a touch sensor area that overlaps the display area DA. The touch lines of the touch sensing unit TSU are disposed in a touch peripheral area that overlaps the non-display area NDA.

The sub-area SBA of the display panel 100 extends from one side of the main area MA.

The sub-area SBA includes a flexible material that can be bent, folded, rolled, etc. For example, when the sub-area SBA is bent, the sub-area SBA can overlap the main area MA in the thickness direction (Z-axis direction). The sub-area SBA includes the display driving unit 200 and the pad portion connected to a circuit board 300.

Figure 5:
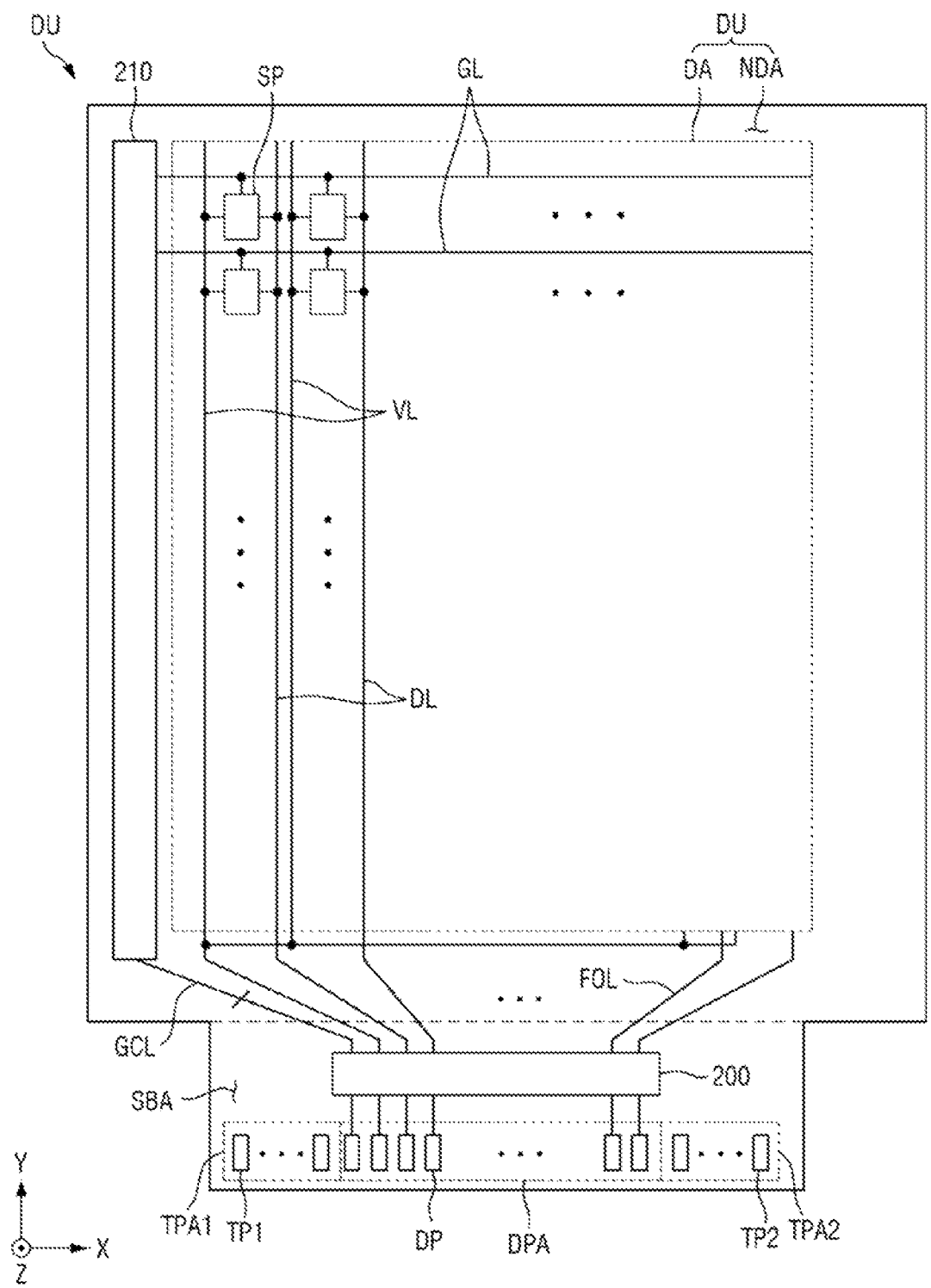
FIG. 5 is a plan view of a display unit of a display device according to an embodiment.

FIG. 5 is a plan view of a display unit of a display device according to an embodiment.

Referring to FIG. 5, in an embodiment, the display area DA of the display unit DU displays an image and is a central area of the display panel 100. The display area DA includes a plurality of pixels SP, a plurality of gate lines GL, a plurality of data lines DL, and a plurality of power lines VL. Each of the plurality of pixels SP is a minimum unit for outputting light.

The plurality of gate lines GL supply the gate signal received from the gate driving unit 210 to the plurality of pixels SP. The plurality of gate lines GL extend in the X-axis direction and are spaced apart from each other in the Y-axis direction that intersects the X-axis direction.

The plurality of data lines DL supply the data voltage received from the display driving unit 200 to the plurality of pixels SP. The plurality of data lines DL extend in the Y-axis direction and are spaced apart from each other in the X-axis direction.

The plurality of power lines VL supply a power voltage received from the display driving unit 200 to the plurality of pixels SP. The power voltage is at least one of a driving voltage, an initialization voltage, or a reference voltage. The plurality of power lines VL extend in the Y-axis direction and are spaced apart from each other in the X-axis direction.

The non-display area NDA of the display unit DU surrounds the display area DA. The non-display area NDA includes a gate driving unit 210, fan-out lines FOL, and gate control lines GCL. The gate driving unit 210 generates a plurality of gate signals based on the gate control signal, and sequentially supplies the plurality of gate signals to the plurality of gate lines GL according to a set order.

The fan-out lines FOL extend from the display driving unit 200 to the display area DA. The fan-out lines FOL supply the data voltage received from the display driving unit 200 to the plurality of data lines DL.

The gate control line GCL extends from the display driving unit 200 to the gate driving unit 210. The gate control line GCL supplies the gate control signal received from the display driving unit 200 to the gate driving unit 210.

The sub-area SBA includes the display driving unit 200, a display pad area DPA, and first and second touch pad areas TPA1 and TPA2.

The display driving unit 200 outputs signals and voltages that drive the display panel 100 to the fan-out lines FOL. The display driving unit 200 supplies the data voltage through the fan-out lines FOL to the data lines DL. The data voltage is supplied to the plurality of pixels SP and determines luminance of each of the plurality of pixels SP. The display driving unit 200 supplies the gate control signal through the gate control line GCL to the gate driving unit 210.

The display pad area DPA, the first touch pad area TPA1, and the second touch pad area TPA2 are disposed at an edge of the sub-area SBA. The display pad area DPA, the first touch pad area TPA1, and the second touch pad area TPA2 are electrically connected to the circuit board 300 using an anisotropic conductive film or a low-resistance and high-reliability material such as SAP.

The display pad area DPA includes a plurality of display pad portions DP. The plurality of display pad portions DP are connected to the main processor 500 through the circuit board 300. The plurality of display pad portions DP are connected to the circuit board 300 to receive digital video data, and supply the digital video data to the display driving unit 200.

Figure 6:
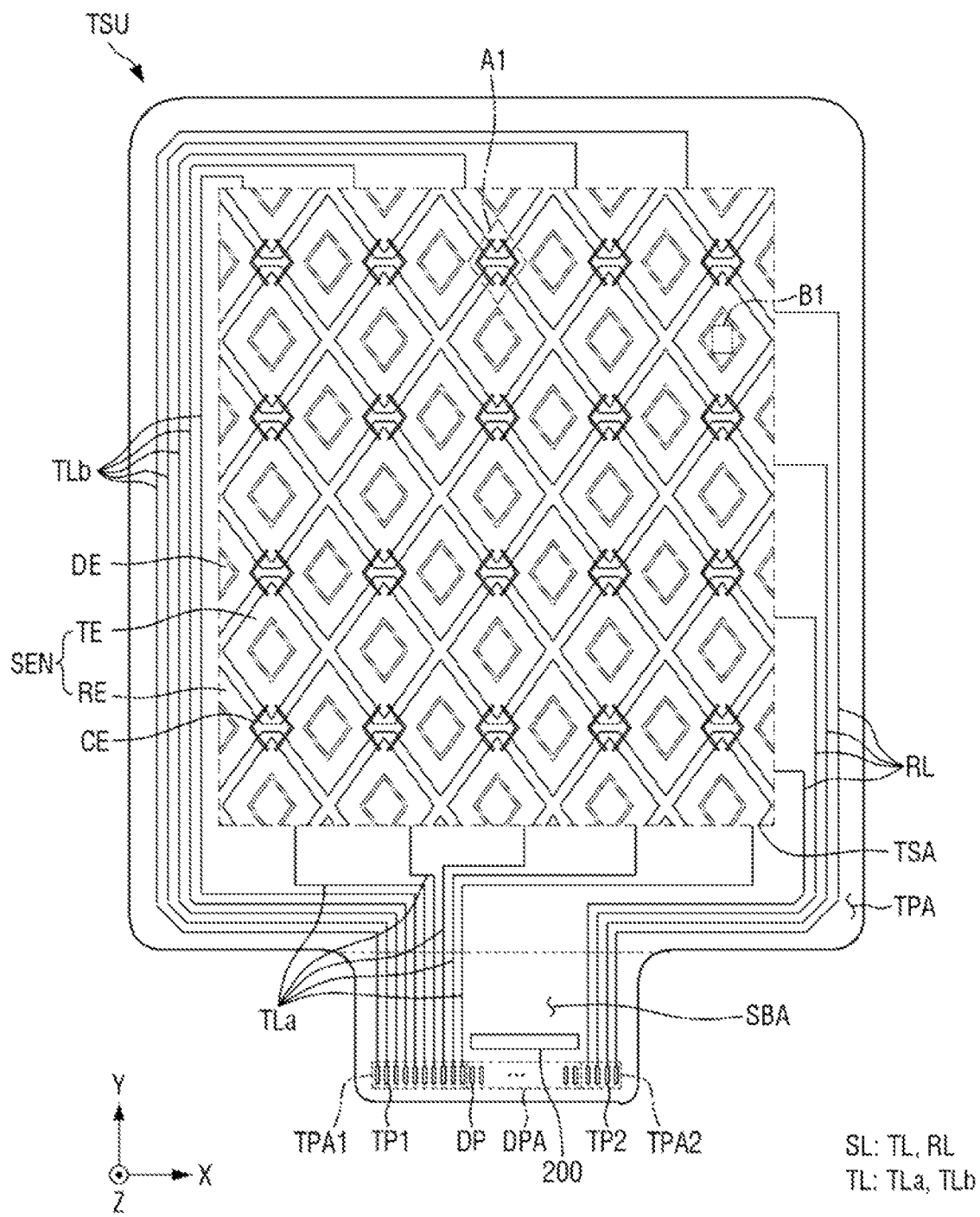
FIG. 6 is a plan view of a touch sensing unit of a display device according to an embodiment.

FIG. 6 is a plan view of a touch sensing unit of a display device according to an embodiment.

Referring to FIG. 6, the touch sensing unit TSU includes a touch sensor area TSA that sensing a user's touch, and a touch peripheral area TPA disposed around the touch sensor area TSA. The touch sensor area TSA overlaps the display area DA of the display unit DU, and the touch peripheral area TPA overlaps the non-display area NDA of the display unit DU.

The touch sensor area TSA includes a plurality of touch electrodes SEN and a plurality of dummy electrodes DE. The plurality of touch electrodes SEN form a mutual capacitance or a self capacitance to sense a touch of an object or a person. The plurality of touch electrodes SEN include a plurality of driving electrodes TE and a plurality of sensing electrodes RE.

The plurality of driving electrodes TE are arranged in the X-axis direction and the Y-axis direction. The plurality of driving electrodes TE are spaced apart from each other in the X-axis direction and the Y-axis direction. The driving electrodes TE adjacent to each other in the Y-axis direction are electrically connected to each other through a plurality of connection electrodes CE.

The plurality of driving electrodes TE are connected to a first touch pad portion TP1 through a driving line TL. The driving line TL includes a lower driving line TLa and an upper driving line TLb. For example, driving electrodes TE disposed on a lower side of the touch sensor area TSA are connected to the first touch pad portion TP1 through the lower driving line TLa, and driving electrodes TE disposed on an upper side of the touch sensor area TSA are connected to the first touch pad portion TP1 through the upper driving line TLb. The lower driving line TLa pass through a lower side of the touch peripheral area TPA and extend to the first touch pad portion TP1. The upper driving line TLb extend to the first touch pad portion TP1 via upper, left, and lower sides of the touch peripheral area TPA. The first touch pad portion TP1 is connected to the touch driving unit 400 through the circuit board 300.

The connection electrode CE is bent at least once. For example, the connection electrode CE has a clamp shape ("<" or ">"), but the shape of the connection electrode CE in a plan view is not necessarily limited thereto. The driving electrodes TE adjacent to each other in the Y-axis direction are electrically connected to each other by the plurality of connection electrodes CE, and even if one of the plurality of connection electrodes CE is disconnected, the driving electrodes TE remain stably connected to each other through the remaining connection electrodes CE. The driving electrodes TE adjacent to each other are connected by two connection electrodes CE, but the number of connection electrodes CE is not necessarily limited thereto.

The connection electrodes CE are disposed on a different layer from the plurality of driving electrodes TE and the plurality of sensing electrodes RE. The sensing electrodes RE adjacent to each other in the X-axis direction are electrically connected to each other through a connection portion disposed on the same layer as the plurality of driving electrodes TE or the plurality of sensing electrodes RE. For example, the plurality of sensing electrodes RE extend in the X-axis direction and are spaced apart from each other in the Y-axis direction. The plurality of sensing electrodes RE are arranged in the X-axis direction and the Y-axis direction, and the sensing electrodes RE adjacent to each other in the X-axis direction are electrically connected to each other through the connection portion.

The driving electrodes TE adjacent to each other in the Y-axis direction are electrically connected to each other through the connection electrodes CE disposed on different layers from the plurality of driving electrodes TE or the plurality of sensing electrodes RE. The connection electrodes CE are formed on a rear surface (or a lower surface) of a layer on which the driving electrodes TE and the sensing electrodes RE are formed. The connection electrodes CE are electrically connected to the respective driving electrodes TE through a plurality of contact holes. Accordingly, even if the connection electrodes CE overlap the plurality of sensing electrodes RE in the Z-axis direction, the plurality of connection electrodes CE and the plurality of sensing electrodes RE are insulated from each other. Mutual capacitances form between the driving electrode TE and the sensing electrode RE.

The plurality of sensing electrodes RE are connected to a second touch pad portion TP2 through a sensing line RL. For example, some of the sensing electrodes RE disposed on the right side of the touch sensor area TSA are connected to the second touch pad portion TP2 through the sensing line RL. The sensing line RL extends through the right and lower sides of the touch peripheral area TPA to the second touch pad portion TP2. The second touch pad portion TP2 is connected to the touch driving unit 400 through the circuit board 300.

Each of the plurality of dummy electrodes DE is surrounded by the driving electrode TE or the sensing electrode RE. Each of the plurality of dummy electrodes DE is spaced apart from and insulated from the driving electrode TE or the sensing electrode RE. Accordingly, the dummy electrode DE electrically floats.

Code patterns in a shape of a planar code are formed at predetermined intervals on at least some areas of the front surface of at least one of the plurality of driving electrode TE, the plurality of sensing electrodes RE, and the plurality of dummy electrodes DE. In addition, an infrared scattering layer is formed on the front surfaces of the plurality of driving electrodes TE, the plurality of sensing electrodes RE, and the plurality of dummy electrodes DE as well as the code patterns. Since the infrared scattering layer covers the plurality of driving electrodes TE, the plurality of sensing electrodes RE, and the plurality of dummy electrodes DE as well as the code patterns, the infrared scattering layer includes an infrared scattering pattern according to an arrangement shape of the plurality of driving electrodes TE, the plurality of sensing electrodes RE, and the plurality of dummy electrodes DE.

The display pad area DPA, the first touch pad area TPA1, and the second touch pad area TPA2 are disposed at an edge of the sub-area SBA. The display pad area DPA, the first touch pad area TPA1, and the second touch pad area TPA2 are electrically connected to the circuit board 300 using an anisotropic conductive film or a low-resistance and high-reliability material such as SAP.

The first touch pad area TPA1 is disposed on one side of the display pad area DPA and includes a plurality of first touch pad portions TP1. The plurality of first touch pad portions TP1 are electrically connected to the touch driving unit 400 disposed on the circuit board 300. The plurality of first touch pad portions TP1 supply a touch driving signal through the plurality of driving lines TL to the plurality of driving electrodes TE.

The second touch pad area TPA2 is disposed on the other side of the display pad area DPA and includes a plurality of second touch pad portions TP2. The plurality of second touch pad portions TP2 are electrically connected to the touch driving unit 400 disposed on the circuit board 300. The touch driving unit 400 receives a touch sensing signal through the plurality of sensing lines RL connected to the plurality of second touch pad portions TP2, and senses a mutual capacitance change between the driving electrode TE and the sensing electrode RE.

In an embodiment, the touch driving unit 400 supplies a touch driving signal to each of the plurality of driving electrodes TE and the plurality of sensing electrodes RE, and receives a touch sensing signal from each of the plurality of driving electrodes TE and the plurality of sensing electrodes RE. The touch driving unit 400 senses a charge change amount of each of the plurality of driving electrodes TE and the plurality of sensing electrodes RE based on the touch sensing signal.

Figure 7:
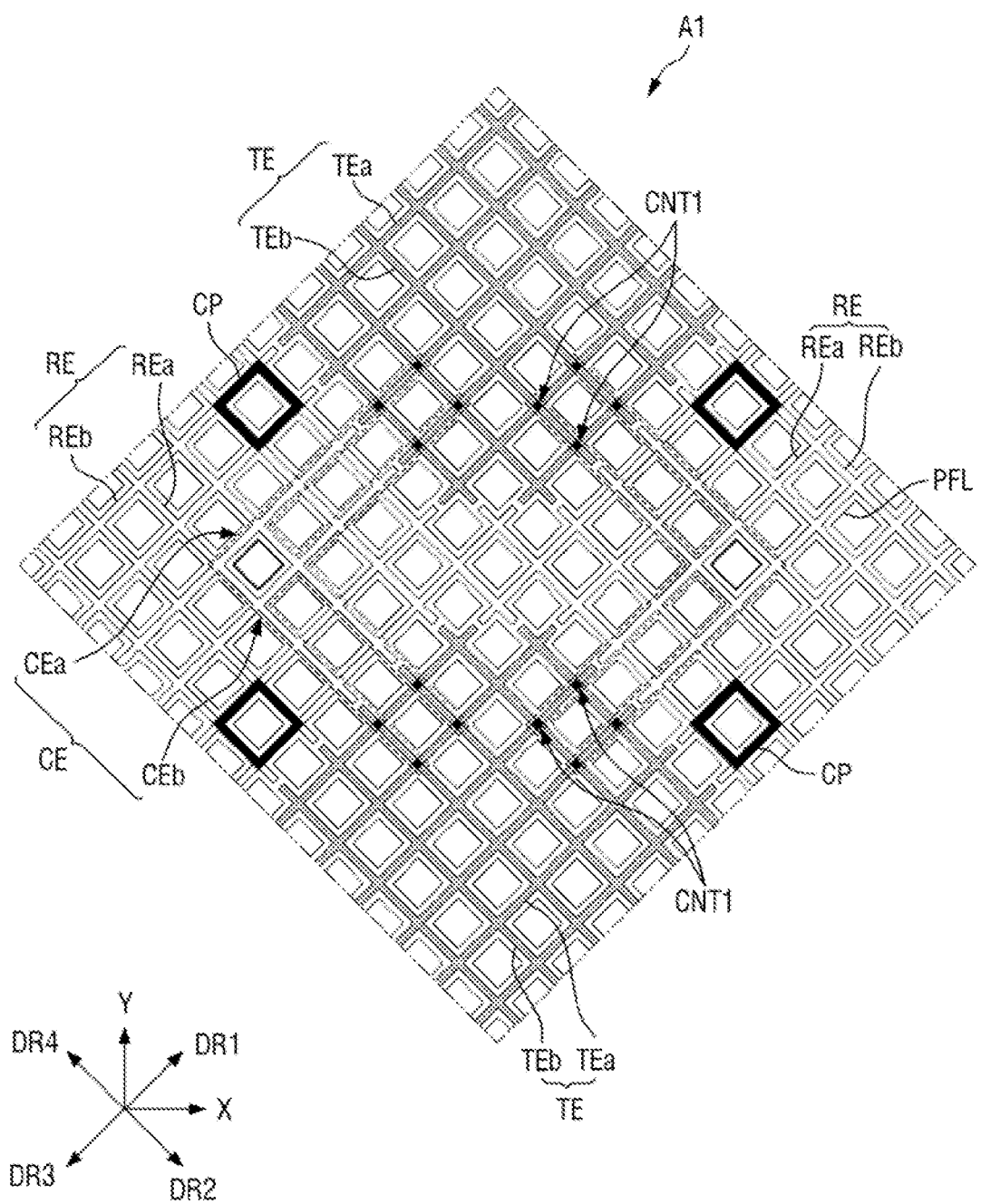
FIG. 7 is an enlarged view of area μl of FIG. 6.
Figure 8:
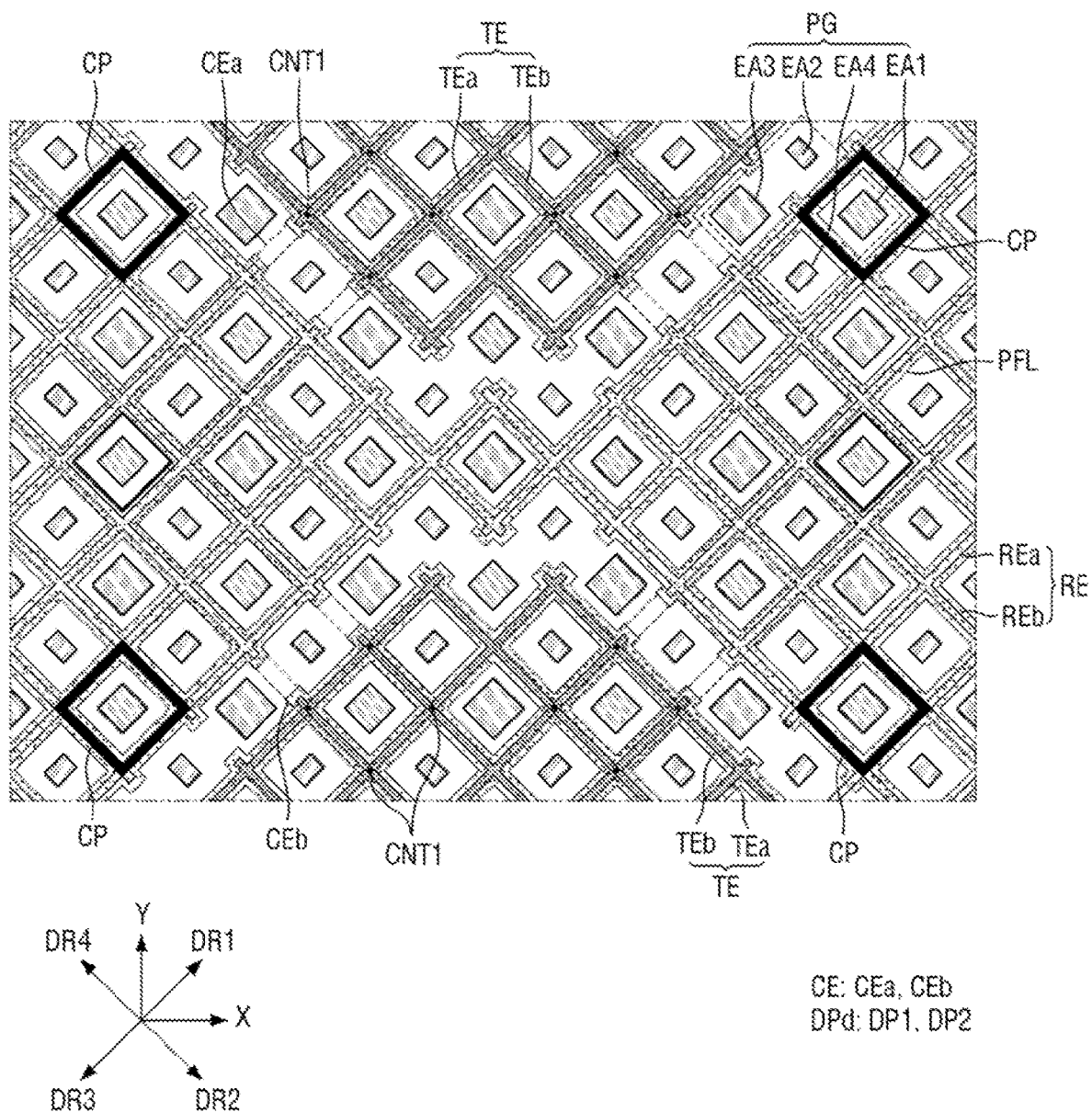
FIG. 8 is an enlarged view of area μl in which code patterns and an infrared diffusion layer are formed, according to an embodiment.

FIG. 7 is an enlarged view of area μl of FIG. 6. In addition, FIG. 8 is an enlarged view of area μl in which code patterns and an infrared diffusion layer are formed according to an embodiment.

Referring to 7 and 8, in an embodiment, the plurality of driving electrodes TE, the plurality of sensing electrodes RE, and the plurality of dummy electrodes DE are disposed on the same layer and are spaced apart from each other.

The plurality of driving electrodes TE are arranged in the X-axis direction and the Y-axis direction. The plurality of driving electrodes TE are spaced apart from each other in the X-axis direction and the Y-axis direction. The driving electrodes TE adjacent to each other in the Y-axis direction are electrically connected to each other through the connection electrodes CE.

The plurality of sensing electrodes RE extend in the X-axis direction and are spaced apart from each other in the Y-axis direction. The plurality of sensing electrodes RE are arranged in the X-axis direction and the Y-axis direction, and the sensing electrodes RE adjacent to each other in the X-axis direction are electrically connected to each other. For example, the sensing electrodes RE are electrically connected to each other through a connection portion, and the connection portion is disposed within the shortest distance between the adjacent driving electrodes TE.

The plurality of connection electrodes CE are disposed on a different layer from the driving electrode TE and the sensing electrode RE, such as a rear layer. The connection electrode CE includes a first portion CEa and a second portion CEb. For example, the first portion CEa of the connection electrode CE IS connected to the driving electrode TE disposed on one side through a first contact hole CNT1 and extends in a third direction DR3. The second portion CEb of the connection electrode CE is bent from the first portion CEa in an area that overlaps the sensing electrode RE and extends in a second direction DR2, and is connected to the driving electrode TE disposed on the other side through the first contact hole CNT1. Hereinafter, the first direction DR1 refers to a direction between the X-axis direction and the Y-axis direction, the second direction DR2 refers to a direction between a direction opposite to the Y-axis direction and the X-axis direction, the third direction DR3 refers to a direction opposite to the first direction DR1, and the fourth direction DR4 refers to a direction opposite to the second direction DR2. Accordingly, each of the plurality of connection electrodes CE connects driving electrodes TE adjacent to each other in the Y-axis direction.

The plurality of pixels SP are organized into pixel groups PG. Each pixel group PG includes first to third sub-pixels or first to fourth sub-pixels, and each of the first to fourth sub-pixels includes first to fourth light emitting areas EA1, EA2, EA3, and EA4. For example, the first light emitting area EA1 emits light of a first color, such as red light, the second light emitting area EA2 emits light of a second color, such as green light, and the third light emitting area EA3 emits light of a third color, such as blue light. In addition, the fourth light emitting area EA4 emits light of a fourth color, such as white light or light of any one of the first to third colors, but embodiments are not necessarily limited thereto.

One pixel group PG expresses a white grayscale through the first to third light emitting areas EA1 to EA3 or the first to fourth light emitting areas EA1 to EA4. In addition, grayscales of various colors, such as white, can be expressed by a combination of light emitted from the first to third light emitting areas EA1 to EA3 or the first to fourth light emitting areas EA1 to EA4.

According to an arrangement structure of the first to third sub-pixels or the first to fourth sub-pixels, the plurality of driving electrodes TE, the plurality of sensing electrodes RE, and the plurality of dummy electrodes DE are formed in a mesh structure or a net structure in a plan view.

The plurality of driving electrodes TE, the plurality of sensing electrodes RE, and the plurality of dummy electrodes DE surround the first to third light emitting areas EA1 to EA3 or the first to fourth light emitting areas EA1 to EA4 of the pixel group PG in a plan view. Therefore, the plurality of driving electrodes TE, the plurality of sensing electrodes RE, and the plurality of dummy electrodes DE do not overlap the first to fourth light emitting areas EA1 to EA4. The plurality of connection electrodes CE also do not overlap the first to fourth light emitting areas EA1 to EA4. Therefore, the display device 10 prevents luminance of the light emitted from the first to fourth light emitting areas EA1 to EA4 from being reduced by the touch sensing unit TSU.

Each of the plurality of driving electrodes TE includes a first portion TEa that extends in the first direction DR1 and a second portion TEb that extends in the second direction DR2, and the first and second portions TEa and TEb do not overlap the first to fourth light emitting areas EA1 to EA4. In addition, each of the plurality of sensing electrodes RE includes a first portion REa that extends in the first direction DR1 and a second portion REb that extends in the second direction DR2, and the first and second portions REa and REb do not overlap the first to fourth light emitting areas EA1 to EA4. The plurality of dummy electrodes DE also do not overlap the first to fourth light emitting areas EA1 to EA4.

Code patterns CP are formed on the front surfaces of at least some of the plurality of dummy electrodes DE, the plurality of driving electrodes TE, and the plurality of sensing electrodes RE. The code patterns CP may be formed at predetermined intervals, such as intervals of about 300 µm, along the X-axis direction and the Y-axis direction in some areas of the front surfaces of the plurality of dummy electrodes DE, the plurality of driving electrodes TE, and the plurality of sensing electrodes RE. Each of the code patterns CP covers some areas of the front surface of at least one of the plurality of driving electrodes TE, the plurality of sensing electrodes RE, and the plurality of dummy electrodes DE with a planar code shape having a preset size. The code patterns CP cover not only some areas of the front surfaces of the respective electrodes, but also at least one side surface together with the front surfaces.

The code patterns CP minimize reflectivity of infrared light by absorbing and blocking infrared light transmitted from the touch input device 20, and are recognized as code patterns by the touch input device 20 according to a code shape in which the reflectivity of the infrared light is minimized. An inclined surface with a predetermined inclination is formed on at least one of the side surface and the front surface according to a shape of the covered electrode.

The planar code shape of the code patterns CP has a closed loop shape such as one of a rectangle, a square, a circle, or a rhombus. In an embodiment, the planar code shape of the code patterns CP has an open loop shape that surrounds only a portion of a light emitting area. In an embodiment, the planar code shape of the code patterns CP has a straight line shape or a curved shape that has a preset length. In an embodiment, when the code patterns CP surround the plurality of light emitting areas instead of one light emitting area, a shape of each of the code patterns CP has a mesh structure or a net structure in a plan view. However, hereinafter, an embodiment in which the planar shape of the code patterns CP has a rhombus shape that forms a closed loop will be described below.

An infrared scattering layer PFL is formed on the front surfaces of the plurality of driving electrodes TE, the plurality of sensing electrodes RE, and the plurality of dummy electrodes DE as well as the code patterns CP. The infrared scattering layer PFL has a pattern according to an arrangement shape of the plurality of driving electrodes TE, the plurality of sensing electrodes RE, and the plurality of dummy electrodes DE. An overall shape of the infrared scattering layer PFL has a mesh structure or a net structure in a plan view. The infrared scattering layer PFL covers the front surfaces and at least one side surface of the plurality of driving electrodes TE, the plurality of sensing electrodes RE, and the plurality of dummy electrodes DE as well as the code patterns CP. In an embodiment, the infrared scattering layer PFL includes a plurality of patterns that cover some of the plurality of driving electrodes TE, the plurality of sensing electrodes RE, and the plurality of dummy electrodes DE, for example, only some of the front and side surfaces of each electrode. Accordingly, a plurality of the infrared scattering layers PFL has a shape of a straight line or a curve that has a predetermined length. In an embodiment, a plurality of infrared scattering layers PFL have an open loop shape that is bent to partially surround at least one light emitting area. However, hereinafter, an embodiment in which the infrared scattering layer PFL covers all of the plurality of dummy electrodes DE, the plurality of driving electrodes TE, and the plurality of sensing electrodes RE to improve an overall infrared diffusion and distribution will be described.

Figure 9:
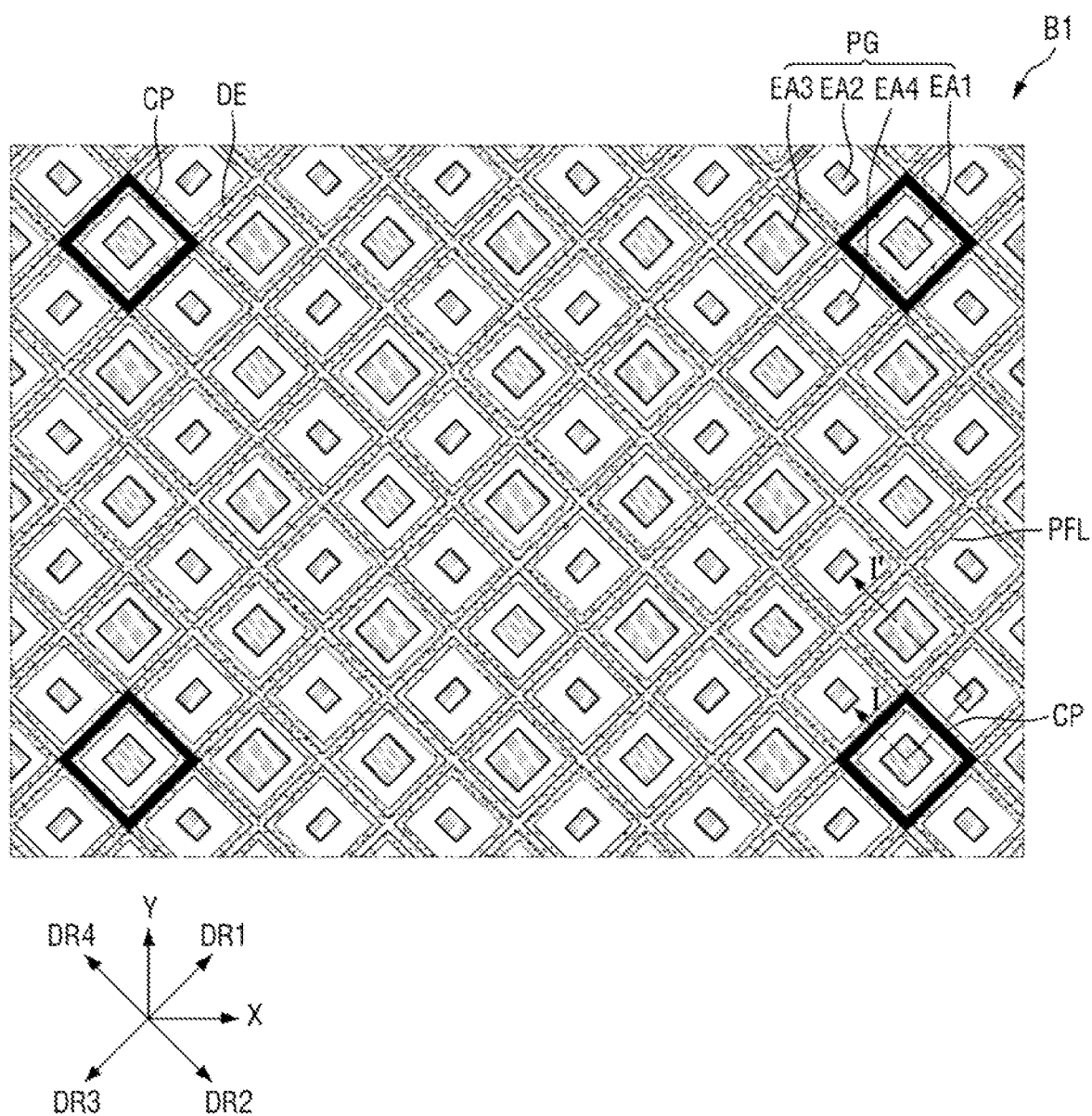
FIG. 9 is an enlarged view of code patterns and an infrared diffusion layer of area B1 illustrated in FIG. 6.

FIG. 9 is an enlarged view of code patterns and an infrared diffusion layer of area B1 illustrated in FIG. 6.

Referring to FIG. 9, in an embodiment, the code patterns CP are formed at preset intervals of about 300 µm on the front surfaces of the driving electrodes TE and the sensing electrodes RE as well as the dummy electrodes DE.

The width, size, and length of the code patterns CP in at least one direction corresponds to the size, sensing area, arrangement, etc., of each light receiving unit 21(b) or each optical image sensor in the code detection unit 21 of the touch input device 20. The code patterns CP are formed of a light blocking member that absorbs and blocks infrared light, and are thus darker and have a higher light blocking rate than the light emitting areas EA1 to EA4 or the electrodes DE, TE, and RE therearound. Accordingly, the code detection unit 21 of the touch input device 20 can recognize the width, size, and length of the code patterns CP, which have a clearer contrast difference than the light emitting areas EA1 to EA4 or the electrodes DE, TE, and RE therearound, to sense the code shape of each of the code patterns CP.

For diffusion and distribution of infrared light reflected by the code patterns CP and respective electrodes DE, TE, and RE, an infrared scattering layer PFL covers all of the respective electrodes DE, TE, and RE, as well as the code patterns CP. The infrared scattering layer PFL is formed of an organic or inorganic material layer that includes a plurality of infrared scatterers. The infrared scatterers of the infrared scattering layer PFL have a size and particle shape that transmits light in a preset visible light wavelength band while reflecting and scattering light in a preset infrared wavelength band, according to experimental values. In addition, the infrared scatterers have a preset density in the organic or inorganic material layer, according to an experimental value.

As described above, as the infrared scattering layer PFL that scatters infrared light is formed on the front areas of the touch electrodes SEN and the dummy electrodes DE as well as the code patterns CP, the infrared reflection characteristics and light collection rate of the touch electrodes SEN and the dummy electrodes DE are reduced. Accordingly, infrared light saturation in the display panel 100 is prevented and the recognition rate and accuracy of the code patterns CP of the touch input device 20 are increased.

Figure 10:
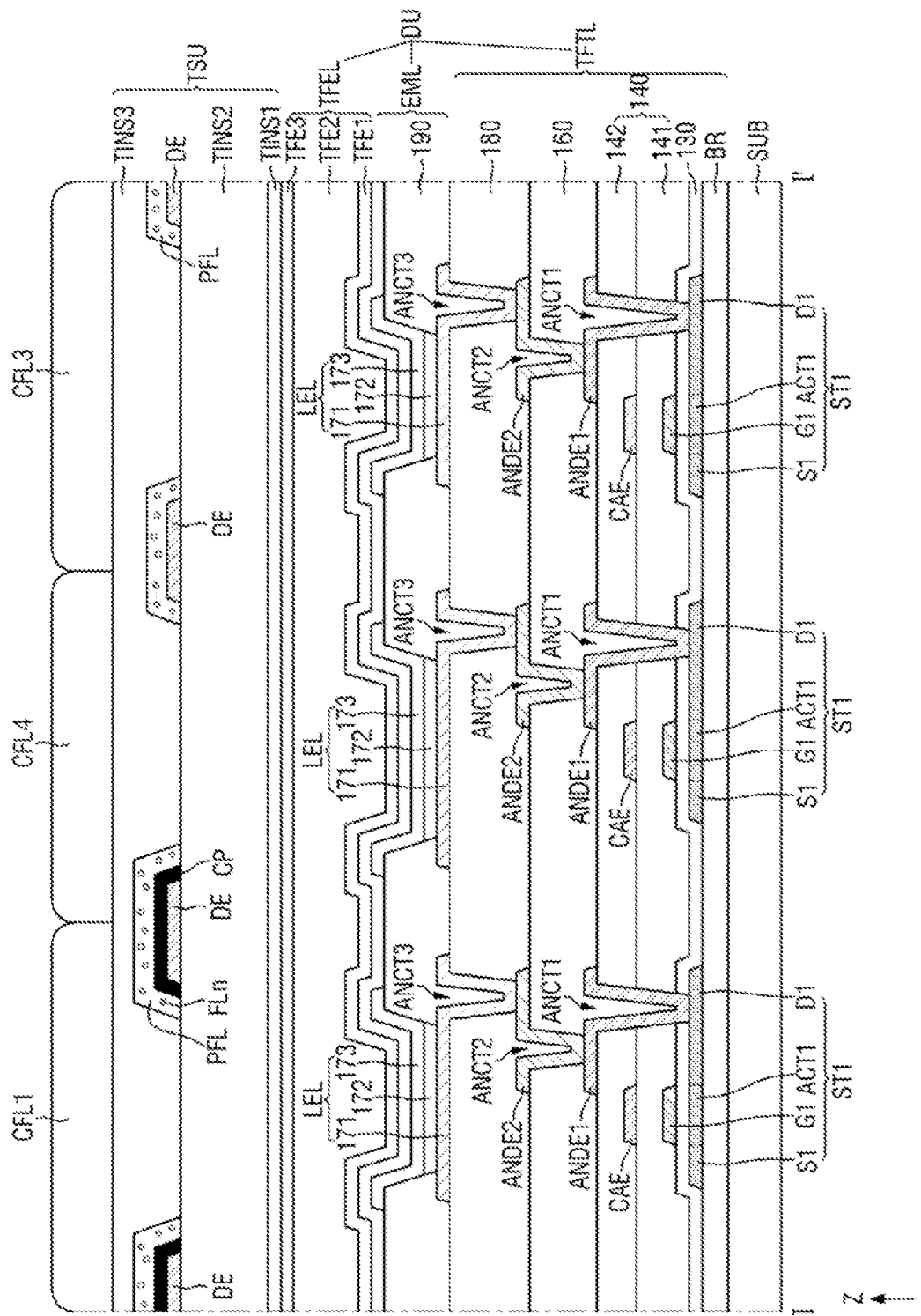
FIG. 10 is a cross-sectional view taken along line I-I' of FIG. 9, according to an embodiment.

FIG. 10 is a cross-sectional view taken along line I-I' of FIG. 9, according to an embodiment. In addition, FIG. 11 is a cross-sectional view of a cross-sectional structure taken along line I-I' of FIG. 10.

Figure 11:
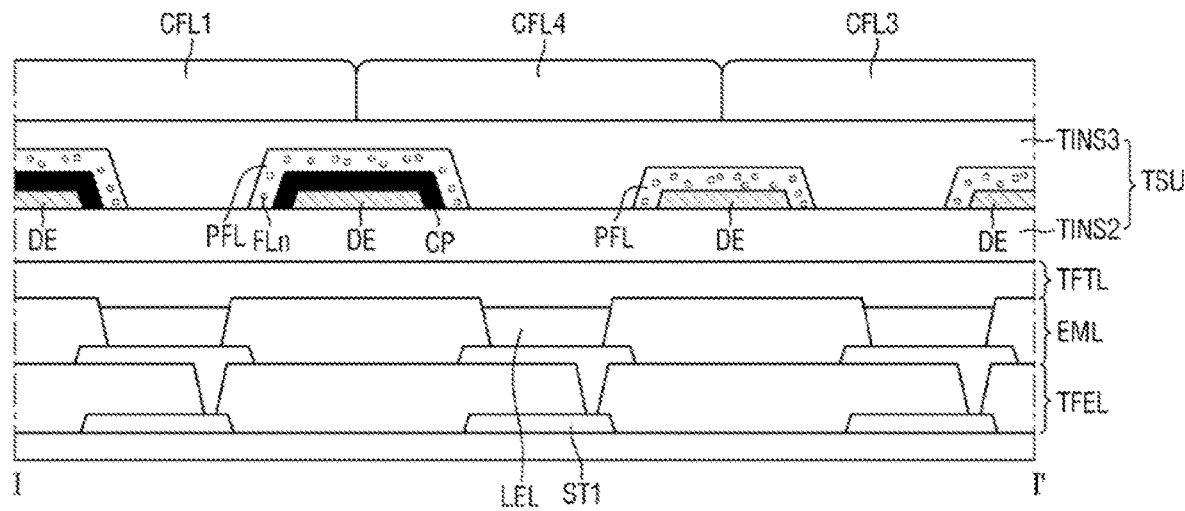
FIG. 11 is a cross-sectional view of a portion of a structure taken along line I-I' of FIG. 10.

Referring to FIGS. 10 and 11, in an embodiment, a barrier layer BR is disposed on the substrate SUB. The substrate SUB is made of an insulating material such as a polymer resin. For example, the substrate SUB is made of polyimide. The substrate SUB is a flexible substrate that can be bent, folded, rolled, etc.

The barrier layer BR protects the transistors of the thin film transistor layer TFTL and a light emitting layer 172 of the light emitting element layer EML from moisture that permeates through the substrate SUB, which is vulnerable to moisture permeation. The barrier layer BR is made of a plurality of inorganic layers that are alternately stacked. For example, the barrier layer BR includes multiple layers in which one or more inorganic layers of a silicon nitride layer, a silicon oxynitride layer, a silicon oxide layer, a titanium oxide layer, or an aluminum oxide layer are alternately stacked.

Thin film transistors ST1 are disposed on the barrier layer BR. Each of the thin film transistors ST1 includes an active layer ACT1, a gate electrode G1, a source electrode S1, and a drain electrode D1.

The active layer ACT1, the source electrode S1, and the drain electrode D1 of each of the thin film transistors ST1 are disposed on the barrier layer BR. The active layer ACT1 of the thin film transistor ST1 includes at least one of polycrystalline silicon, single crystal silicon, low-temperature polycrystalline silicon, amorphous silicon, or an oxide semiconductor. The active layer ACT1, which overlaps the gate electrode G1 in the third direction (Z-axis direction), which is the thickness direction of the substrate SUB, is a channel area. The source electrode S1 and the drain electrode D1 are located on either side of the active area ACT1 and do not overlap the gate electrode G1 in the third direction (Z-axis direction), and are conductive due to doping a silicon semiconductor or an oxide semiconductor with ions or impurities.

A gate insulating layer 130 is disposed on the barrier layer BR, the active layer ACT1, the source electrode S1, and the drain electrode D1 of the thin film transistor ST1. The gate insulating layer 130 is formed of an inorganic layer, such as one of a silicon nitride layer, a silicon oxynitride layer, a silicon oxide layer, a titanium oxide layer, or an aluminum oxide layer.

The gate electrode G1 of the thin film transistor ST1 is disposed on the gate insulating layer 130. The gate electrode G1 overlaps the active layer ACT1 in the third direction (Z-axis direction). The gate electrode G1 may have a single layer or a multiple layer structure made of one of molybdenum (Mo), aluminum (Al), chromium (Cr), gold (Au), titanium (Ti), nickel (Ni), neodymium (Nd), or copper (Cu), or alloys thereof.

A first interlayer insulating layer 141 is disposed on the gate insulating layer 130 and the gate electrode G1 of the thin film transistor ST1. The first interlayer insulating layer 141 is an inorganic layer, such as at least one of a silicon nitride layer, a silicon oxynitride layer, a silicon oxide layer, a titanium oxide layer, or an aluminum oxide layer. In an embodiment, the first interlayer insulating layer 141 includes a plurality of inorganic layers.

A capacitor electrode CAE is disposed on the first interlayer insulating layer 141. The capacitor electrode CAE overlaps the gate electrode G1 of the first thin film transistor ST1 in the third direction (Z-axis direction). Since the first interlayer insulating layer 141 has a predetermined dielectric constant, a capacitor is formed by the capacitor electrode CAE, the gate electrode G1, and the first interlayer insulating layer 141 disposed between the capacitor electrode CAE and the gate electrode G1. The capacitor electrode CAE may have a single layer or a multiple layer structure made of one or more of molybdenum (Mo), aluminum (Al), chromium (Cr), gold (Au), titanium (Ti), nickel (Ni), neodymium (Nd), or copper (Cu), or alloys thereof.

A second interlayer insulating layer 142 is disposed on the first interlayer insulating layer 141 and the capacitor electrode CAE. The second interlayer insulating layer 142 is an inorganic layer, such as at least one of a silicon nitride layer, a silicon oxynitride layer, a silicon oxide layer, a titanium oxide layer, or an aluminum oxide layer. In an embodiment, the second interlayer insulating layer 142 includes a plurality of inorganic layers.

A first anode connection electrode ANDE1 is disposed on the second interlayer insulating layer 142. The first anode connection electrode ANDE1 is connected to the drain electrode D1 of the thin film transistor ST1 through a first connection contact hole ANCT1 that penetrates through the gate insulating layer 130, the first interlayer insulating layer 141, and the second interlayer insulating layer 142. The first anode connection electrode ANDE1 has a single layer or a multiple layer structure made of one or more of molybdenum (Mo), aluminum (Al), chromium (Cr), gold (Au), titanium (Ti), nickel (Ni), neodymium (Nd), and copper (Cu), or alloys thereof.

A first planarization layer 160 that planarizes steps caused by the thin film transistor ST1 is disposed on the second interlayer insulating layer 142 and the first anode connection electrode ANDE1. The first planarization layer 160 is an organic layer made of at least one of an acryl resin, an epoxy resin, a phenolic resin, a polyamide resin, a polyimide resin, etc.

A second anode connection electrode ANDE2 is disposed on the first planarization layer 160. The second anode connection electrode ANDE2 is connected to the first anode connection electrode ANDE1 through a second connection contact hole ANCT2 that penetrates through the first planarization layer 160. The second anode connection electrode ANDE2 may have a single layer or a multiple layer structure made of one or more of molybdenum (Mo), aluminum (Al), chromium (Cr), gold (Au), titanium (Ti), nickel (Ni), neodymium (Nd), or copper (Cu), or alloys thereof.

A second planarization layer 180 is disposed on the first planarization layer 160 and the second anode connection electrode ANDE2. The second planarization layer 180 is an organic layer made of at least one of an acryl resin, an epoxy resin, a phenolic resin, a polyamide resin, a polyimide resin, etc.

Light emitting elements LEL and a bank 190 are disposed on the second planarization layer 180. Each of the light emitting elements LEL includes a pixel electrode 171, a light emitting layer 172, and a common electrode 173.

The pixel electrode 171 is disposed on the second planarization layer 180. The pixel electrode 171 is connected to the second anode connection electrode ANDE2 through a third connection contact hole ANCT3 that penetrates through the second planarization layer 180.

In a top emission structure that emits light from the light emitting layer 172 in a direction of the common electrode 173, the pixel electrode 171 is formed of a highly reflective metal, such as one of a stacked structure (Ti/Al/Ti) of aluminum and titanium, a stacked structure (ITO/Al/ITO) of aluminum and indium tin oxide (ITO), an APC alloy, or a stacked structure (ITO/APC/ITO) of an APC alloy and ITO. The APC alloy is an alloy of silver (Ag), palladium (Pd), and copper (Cu).

The bank 190 is formed on the second planarization layer 180 and partitions the pixel electrode 171 and defines the first to third light emitting areas EA1 to EA3. The bank 190 covers an edge of the pixel electrode 171. The bank has an opening that corresponds to the pixel electrode 171. The bank 190 is formed of an organic layer such as one of an acrylic resin, an epoxy resin, a phenolic resin, a polyamide resin, or a polyimide resin.

Each of the first to third light emitting areas EA1 to EA3 is an area in which the pixel electrode 171, the light emitting layer 172, and the common electrode 173 are sequentially stacked and in which holes from the pixel electrode 171 and electrons from the common electrode 173 combine with each other in the light emitting layer 172 to emit light.

The light emitting layer 172 is disposed on the pixel electrode 171 and the bank 190. The light emitting layer 172 includes an organic material that emits light of a predetermined color. For example, the light emitting layer 172 includes a hole transporting layer, an organic material layer, and an electron transporting layer.

The common electrode 173 is disposed on the light emitting layer 172 and the bank 190. The common electrode 173 covers the light emitting layer 172. The common electrode 173 is a common layer that is commonly formed in the first light emitting area EA1, the second light emitting area EA2, and the third light emitting area EA3. A capping layer is formed on the common electrode 173.

In a top emission structure, the common electrode 173 is formed of a transparent conductive material (TCO) such as ITO or indium zinc oxide (IZO) that can transmit light therethrough, or a semi-transmissive conductive material such as magnesium (Mg), silver (Ag), or an alloy of magnesium (Mg) and silver (Ag). When the common electrode 173 is formed of a semi-transmissive conductive material, emission efficiency can be increased by a micro cavity.

An encapsulation layer TFEL is disposed on the common electrode 173. The encapsulation layer TFEL includes at least one inorganic layer that prevents oxygen or moisture from permeating into the light emitting element layer EML. In addition, the encapsulation layer TFEL includes at least one organic layer that protects the light emitting element layer EML from foreign materials such as dust. For example, the encapsulation layer TFEL includes a first encapsulation inorganic layer TFE1, an encapsulation organic layer TFE2, and a second encapsulation inorganic layer TFE3.

The first encapsulation inorganic layer TFE1 is disposed on the common electrode 173, the encapsulation organic layer TFE2 is disposed on the first encapsulation inorganic layer TFE1, and the second encapsulation inorganic layer TFE3 is disposed on the encapsulation organic layer TFE2. The first encapsulation inorganic layer TFE1 and the second encapsulation inorganic layer TFE3 include multiple layers in which one or more inorganic layers, such as a silicon nitride layer, a silicon oxynitride layer, a silicon oxide layer, a titanium oxide layer, or an aluminum oxide layer, are alternately stacked. The encapsulation organic layer TFE2 is an organic layer such as an acrylic resin, an epoxy resin, a phenolic resin, a polyamide resin, or a polyimide resin.

A touch sensing unit TSU is disposed on the encapsulation layer TFEL. The touch sensing unit TSU includes a first touch insulating layer TINS1, the connection electrode CE, a second touch insulating layer TINS2, the driving electrode TE, the sensing electrode RE, and a third touch insulating layer TINS3.

The first touch insulating layer TINS1 is an inorganic layer, such as on of a silicon nitride layer, a silicon oxynitride layer, a silicon oxide layer, a titanium oxide layer, or an aluminum oxide layer.

The connection electrode CE is disposed on the first touch insulating layer TINS1. The connection electrode CE may have a single layer or a multiple layer structure made of one or more of molybdenum (Mo), aluminum (Al), chromium (Cr), gold (Au), titanium (Ti), nickel (Ni), neodymium (Nd), or copper (Cu), or alloys thereof.

The second touch insulating layer TINS2 is disposed on the first touch insulating layer TINS1 and the connection electrodes CE. The second touch insulating layer TINS2 is an inorganic layer, such as one of a silicon nitride layer, a silicon oxynitride layer, a silicon oxide layer, a titanium oxide layer, or an aluminum oxide layer. In an embodiment, the second touch insulating layer TINS2 is an organic layer that includes one of an acryl resin, an epoxy resin, a phenolic resin, a polyamide resin, a polyimide resin, etc.

The driving electrodes TE and the sensing electrodes RE are disposed on the second touch insulating layer TINS2. In addition to the driving electrodes TE and the sensing electrodes RE, the dummy electrodes DE, the first touch driving lines TL1, the second touch driving lines TL2, and the touch sensing lines RL illustrated in FIG. 4 are disposed on the second touch insulating layer TINS2.

The driving electrodes TE, the sensing electrodes RE, and the dummy electrodes DE are formed as a conductive metal electrode, and the conductive metal electrode is formed of one of molybdenum (Mo), aluminum (Al), chromium (Cr), gold (Au), titanium (Ti), nickel (Ni), neodymium (Nd), or copper (Cu), or alloys thereof. The driving electrodes TE, the sensing electrodes RE, and the dummy electrodes DE have a mesh structure or a net structure that does not overlap the light emitting areas EA1 to EA4. Each of the driving electrode TE and the sensing electrode RE partially overlaps the connection electrode CE in the third direction (Z-axis direction). The driving electrode TE is connected to the connection electrode CE through a touch contact hole that penetrates through the second touch insulating layer TINS2.

Since a light blocking member is coated and patterned on the front surfaces of the second touch insulating layer TINS2, the driving electrodes TE, the sensing electrodes RE, and the dummy electrodes DE, code patterns CP are formed on the driving electrodes TE, the sensing electrodes RE, and the dummy electrodes DE.

The light blocking member formed of the code patterns CP includes an infrared or ultraviolet absorbing material. For example, the light blocking member includes material that includes an inorganic or organic pigment. The inorganic pigment includes at least one of carbon black, cyanine, polymethine, anthraquinone, or phthalocyanine-based compounds. In an embodiment, the organic pigment includes at least one of lactam black, perylene black, or aniline black, but embodiments are not necessarily limited thereto.

An organic or inorganic material layer that includes a plurality of infrared scatterers FLn is coated on the front surfaces of the second touch insulating layer TINS2, the driving electrodes TE, the sensing electrodes RE, and the dummy electrodes DE as well as the code patterns CP. In addition, the organic or inorganic material layer that includes the plurality of infrared scatterers FLn is patterned, such that the infrared scattering layer PFL covers all of the driving electrodes TE, the sensing electrodes RE, and the dummy electrodes DE as well as the code patterns CP.

Figure 12:
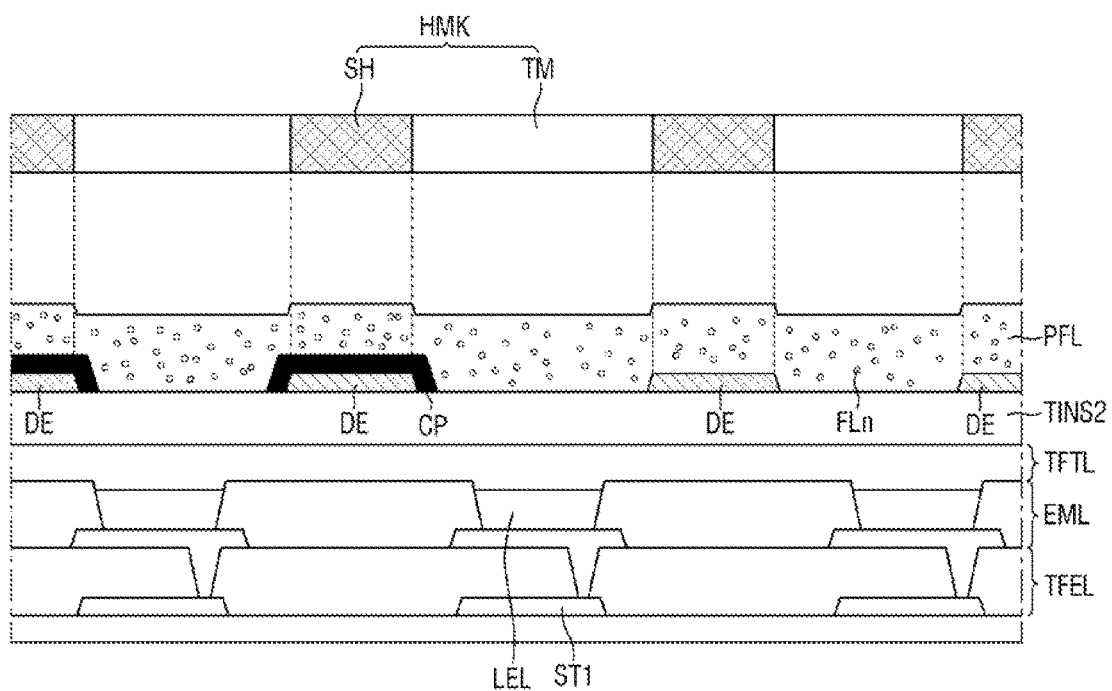
FIG. 12 is a cross-sectional view that illustrates a method of patterning code patterns and a light blocking pattern illustrated in FIGS. 10 and 11.

FIG. 12 is a cross-sectional view that illustrates a method of patterning code patterns and a light blocking pattern illustrated in FIGS. 10 and 11. In addition, FIG. 13 is a cross-sectional view that illustrates a method of manufacturing an infrared diffusion layer illustrated in FIGS. 11 and 12.

Figure 13:
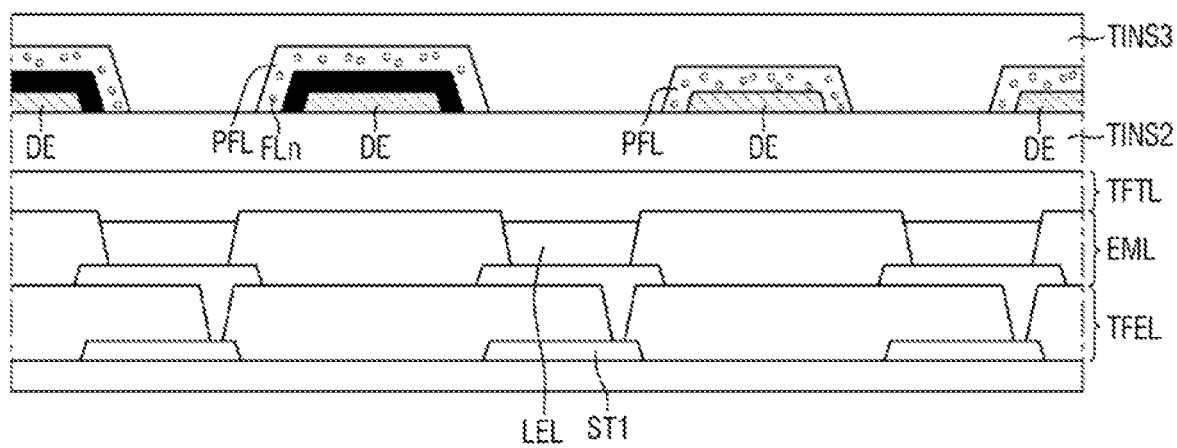
FIG. 13 is a cross-sectional view that illustrates a method of manufacturing an infrared diffusion layer illustrated in FIGS. 11 and 12.

Referring to FIGS. 12 and 13, in an embodiment, the infrared scattering layer PFL is coated on the front surfaces of the second touch insulating layer TINS2, the driving electrodes TE, the sensing electrodes RE, and the dummy electrodes DE as well as the code patterns CP and portions of the infrared scattering layer PFL are exposed by a photomask HMK that includes a transmissive portion TM and a light blocking portion SH.

The light blocking portion SH of the photomask HMK corresponds to the code patterns CP, the driving electrodes TE, the sensing electrodes RE, and the dummy electrodes DE, respectively, and the transmissive portion TM corresponds to each of the light emitting areas EA1 to EA4.

The infrared scattering layer PFL is patterned through an etching process to cover the driving electrodes TE, the sensing electrodes RE, and the dummy electrodes DE as well as the code patterns CP and expose the remaining portions of the second touch insulating layer TINS2.

The infrared scattering layer PFL is formed of an organic or inorganic material layer that includes a plurality of infrared scatterers FLn. The infrared scatterers FLn of the infrared scattering layer PFL have a size and particle shape that transmits light in a preset visible light wavelength band while reflecting and scattering light in a preset infrared wavelength band according to experimental values. In addition, the infrared scatterers FLn have a preset density in the organic or inorganic material layer according to an experimental value.

The infrared scatterers FLn are metal nanoparticles that have at least one of spherical, elliptical, or rod shape. According to the experimental values, for spherical and elliptical metal particles, as a diameter thereof increases, a wavelength band of the reflected and scattered light moves to a longer wavelength band. Accordingly, as the diameter of the spherical and elliptical metal particles increases, infrared wavelength light is reflected and scattered, and visible wavelength light is transmitted. On the other hand, as the diameter of the spherical and elliptical metal particles decreases, visible wavelength light is reflected and scattered, and infrared wavelength light is transmitted. Accordingly, the infrared scattering layer PFL includes spherical and elliptical metal nanoparticles that have diameters that are configures to reflect and scatter infrared wavelength light according to the experimental values.

In addition, according to the experimental values, for rod-shaped metal particles, a wavelength band of light that is scattered and reflected varies according to a ratio of width and length thereof. Specifically, as the width-to-length ratio of the rod-shaped metal particles increases, the wavelength band of the reflected and scattered light moves to a longer wavelength band. Accordingly, for rod-shaped metal particles, as the width-to-length ratio increases, infrared wavelength light is reflected and scattered, and visible wavelength light is transmitted. On the other hand, for rod-shaped metal particles, as the width-to-length ratio decreases, visible wavelength light is reflected and scattered, and infrared wavelength light is transmitted. Accordingly, the infrared scattering layer PFL includes rod-shaped metal nanoparticles whose width-to-length ratio reflects and scatters infrared wavelength light according to the experimental values.

A third touch insulating layer TINS3 is formed on the front surfaces of the second touch insulating layer TINS2 and the infrared scattering layer PFL. The third touch insulating layer TINS3 planarizes steps formed by the driving electrodes TE, the sensing electrodes RE, and the connection electrodes CE. To this end, the third touch insulating layer TINS3 is an inorganic layer, such as on of a silicon nitride layer, a silicon oxynitride layer, a silicon oxide layer, a titanium oxide layer, or an aluminum oxide layer. In an embodiment, the third touch insulating layer TINS3 is an organic layer made of at least one of an acryl resin, an epoxy resin, a phenolic resin, a polyamide resin, a polyimide resin, etc.

A plurality of color filter layers CFL1, CFL3, and CFL4 are formed on the touch sensing unit TSU. For example, the plurality of color filter layers CFL1, CFL3, and CFL4 on the third touch insulating layer TINS3 have a planar shape.

Each of the color filter layers on the third touch insulating layer TINS3 overlaps the first to fourth light emitting areas EA1 to EA4, respectively. In an embodiment, each of the color filter layers is formed on the second touch insulating layer TINS2, the driving electrodes TE and the sensing electrodes RE to overlap the first to fourth light emitting areas EA1 to EA4, respectively. A first color filter CFL1 is disposed on the first light emitting area EA1 that emits first color light, a second color filter is disposed on the second light emitting area EA2 that emits second color light, and a third color filter CFL3 is disposed on the third light emitting area EA3 that emits third color light. In addition, the second color filter may also be disposed on the fourth light emitting area that emits second color light.

Figure 14:
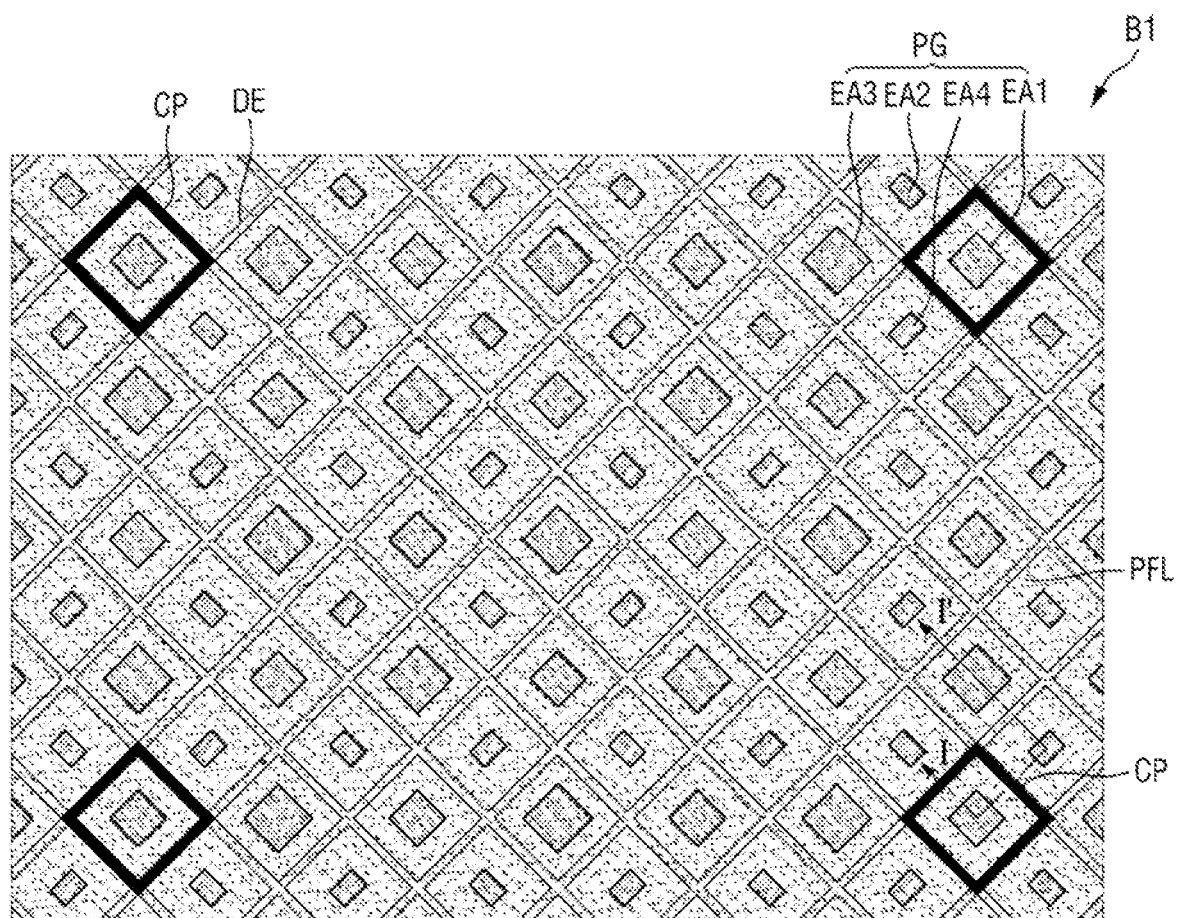
FIG. 14 is an enlarged view of area B1 of FIG. 6 that illustrates an infrared diffusion layer according to an embodiment of the present disclosure.
Figure 14:
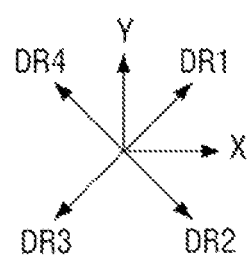

FIG. 14 is an enlarged view of area B1 of FIG. 6 that illustrates an infrared diffusion layer according to an embodiment of the present disclosure. In addition, FIG. 15 is a cross-sectional view taken along line I-I' of FIG. 14.

Figure 15:
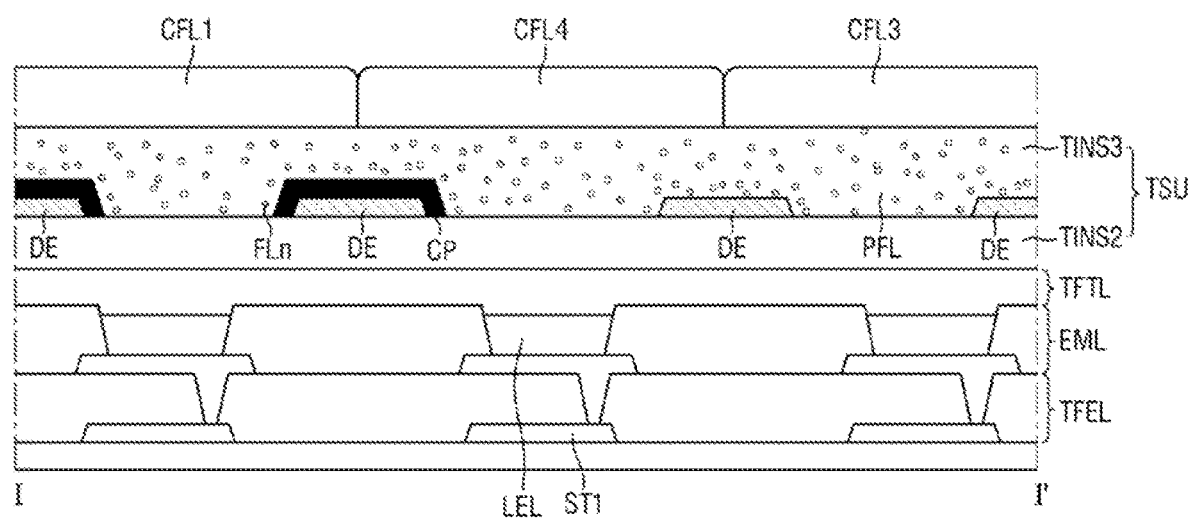
FIG. 15 is a cross-sectional view taken along line I-I' of FIG. 14.

Referring to FIGS. 14 and 15, in an embodiment, for diffusing and distributing infrared light that is reflected from the code patterns CP, the respective touch electrodes SEN, the dummy electrodes DE and the respective pixel areas, the infrared scattering layer PFL is formed in a planar shape that covers all of the respective touch electrodes SEN, the code patterns CP, the dummy electrodes DE and the emission areas EA1 to EA4 of each pixel.

When the infrared scattering layer PFL covers all of the light emitting areas EA1 to EA4 of each pixel, a visible light transmittance of the infrared scattering layer PFL needs to be further increased. For example, as the visible light transmittance of the infrared scattering layer PFL increases, an influence on an image display quality displayed through the pixels is minimized. To this end, the infrared scattering layer PFL includes infrared scatterers FLn that are set and formed to scatter infrared wavelength light and transmit visible wavelength light.

The infrared scattering layer PFL includes spherical and elliptical metal nanoparticles that have diameters configured to scatter infrared wavelength light and transmit visible wavelength light. In an embodiment, the infrared scattering layer PFL further includes rod-shaped metal nanoparticles that have a length-to-width ration that is configures to scatter infrared wavelength light and transmit visible wavelength light. The metal nanoparticles include at least one of gold, silver, copper, or titanium, etc., but are not necessarily limited thereto.

When the infrared scattering layer PFL covers all of the touch electrodes SEN, the code patterns CP, the dummy electrodes DE and the light emitting areas EA1 to EA4 of each pixel, the infrared scattering layer PFL planarizes steps formed by the touch electrode SEN and the dummy electrodes DE. Accordingly, a plurality of color filter layers CFL1, CFL3, and CFL4 are disposed and formed on the infrared scattering layer PFL in a planar shape.

Figure 16:
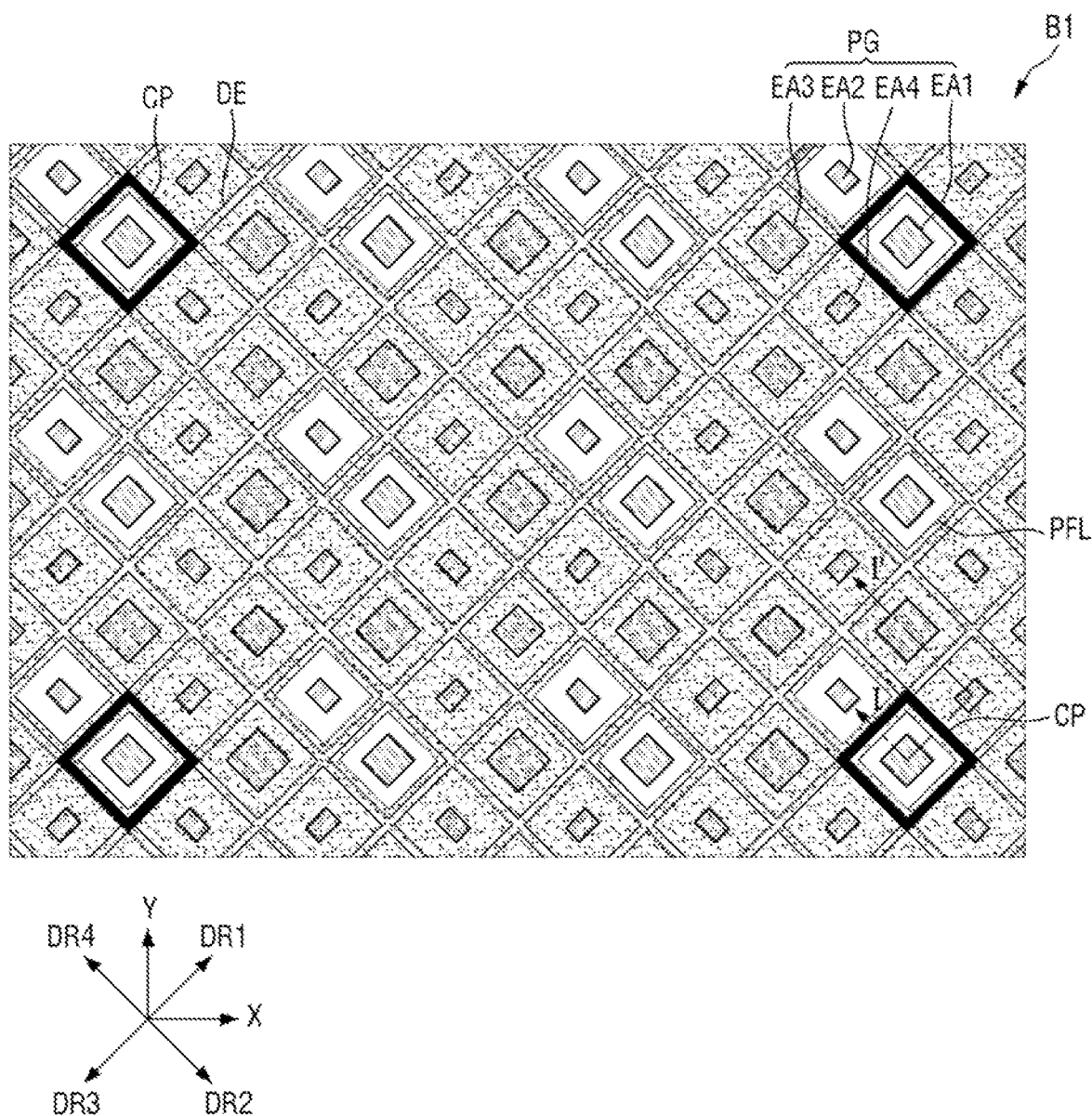
FIG. 16 is an enlarged view of area B1 of FIG. 6 that illustrates an infrared diffusion layer according to an embodiment of the present disclosure.

FIG. 16 is an enlarged view of area B1 of FIG. 6 that illustrates an infrared diffusion layer according to an embodiment of the present disclosure. In addition, FIG. 17 is a cross-sectional view taken along line I-I' of FIG. 16.

Figure 17:
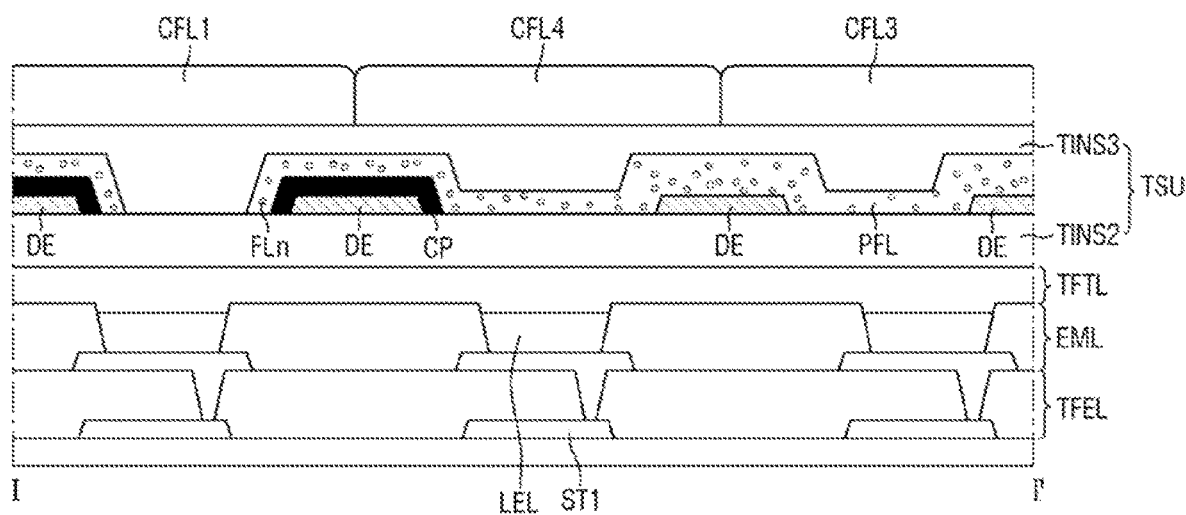
FIG. 17 is a cross-sectional view taken along line I-I' of FIG. 16.

Referring to FIGS. 16 and 17, in an embodiment, the infrared scattering layer PFL covers the touch electrode SEN, the code patterns CP, the dummy electrodes DE, and at least one of the light emitting areas EA1 to EA4 of each pixel.

For example, for diffusing and distributing infrared light that is reflected from at least one pixel area as well as each touch electrode SEN and the dummy electrodes DE, the infrared scattering layer PFL covers the third and fourth light emitting areas EA3 and EA4 but not the first and second light emitting areas EA1 and EA2.

For another example, the infrared scattering layer PFL covers the touch electrodes SEN and the dummy electrodes DE as well as the second to fourth light emitting areas EA2 to EA4, but not the first light emitting area EA1. The light of the first color may be red light, and since a wavelength band of red light is the shortest wavelength band, red light is least affected by the infrared wavelength or scattering by the infrared scattering layer PFL. Accordingly, the infrared scattering layer PFL covers the remaining second to fourth light emitting areas EA2 to EA4, but not the first light emitting areas EA1 that emits the red light.

As illustrated in FIG. 17, a third touch insulating layer TINS3 is formed on the front surfaces of the second touch insulating layer TINS2 and the infrared scattering layer PFL.

Accordingly, the third touch insulating layer TINS3 planarizes steps formed by the driving electrodes TE, the sensing electrodes RE, and the connection electrodes CE. In addition, the plurality of color filter layers CFL1, CFL3, and CFL4 are disposed on the third touch insulating layer TINS3 in a planar shape.

According to a display device of an embodiment and the touch input system that includes the same as described above, a recognition rate of the code patterns CP that are formed of an infrared blocking material is increased by the infrared scattering layer PFL and the arrangement shape of the infrared scattering layer PFL that reduce the infrared specular reflectivity of the display panel 100. In addition, since the infrared scattering layer PFL is formed on the touch electrodes SEN of the display panel 100 and at least one pixel area, the infrared reflectivity of the display panel 100 is reduced. Accordingly, the recognition rate and accuracy of the code patterns CP and code information is increased.

Figure 18:
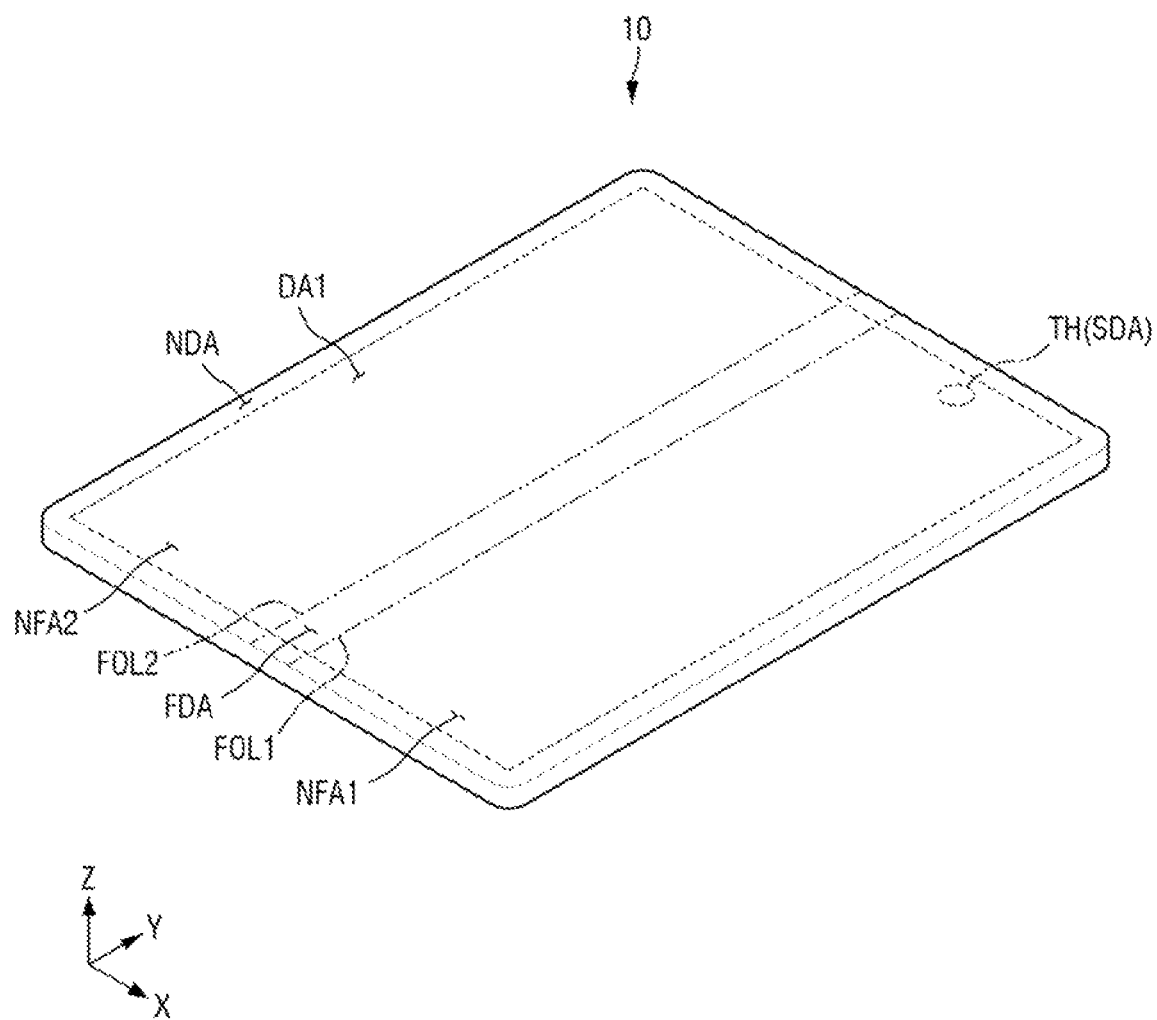
FIGS. 18 and 19 are perspective views of a display device according to an embodiment of the present disclosure.
Figure 19:
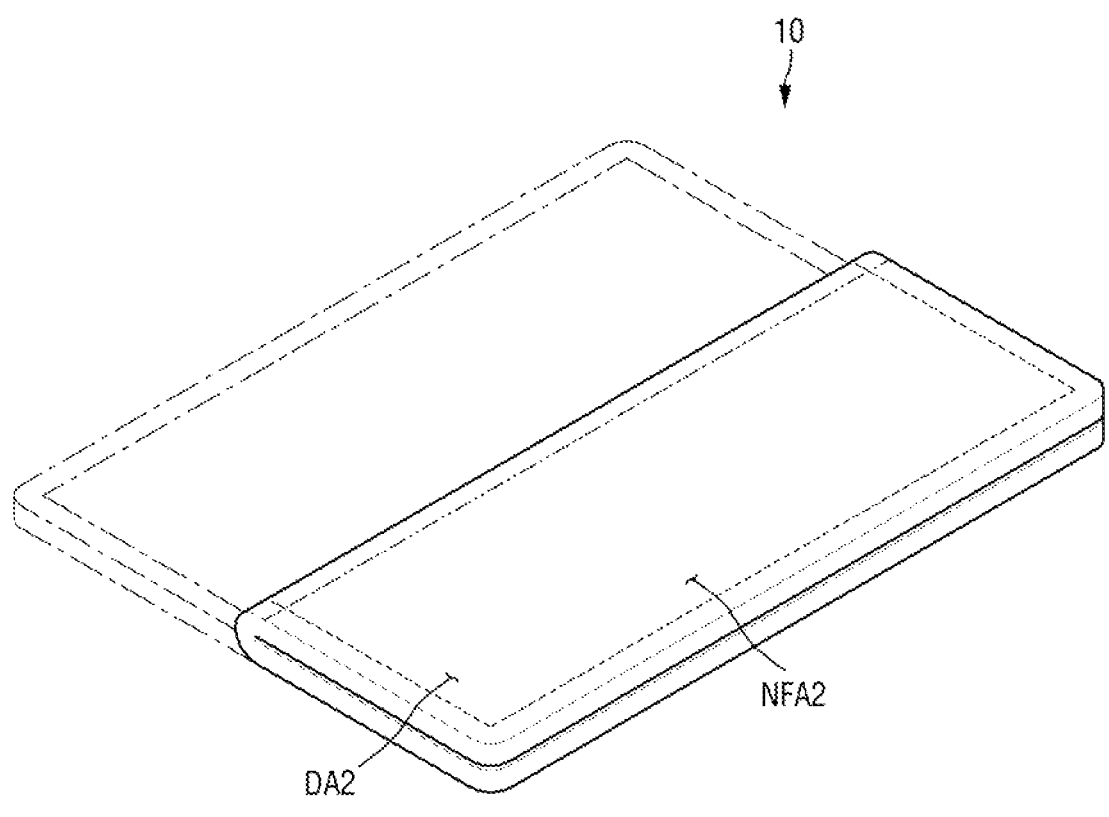

FIGS. 18 and 19 are perspective views of a display device according to an embodiment of the present disclosure.

According to an embodiment, FIGS. 18 and 19 illustrate that the display device 10 is a foldable display device that is folded in the first direction (X-axis direction). The display device 10 can maintain both a folded state and an unfolded state. The display device 10 can be folded in an in-folding manner in which a front surface thereof is disposed inside. When the display device 10 is bent or folded in an in-folding manner, the front surfaces of the display device 10 face each other. Alternatively, the display device 10 can be folded in an out-folding manner in which the front surface thereof is disposed on the outside. When the display device 10 is bent or folded in an out-folding manner, the rear surfaces of the display device 10 face each other.

The display device 10 includes a folding area FDA, a first non-folding area NFA1, and a second non-folding area NFA2. The folding area FDA is where the display device 10 is folded, and the first non-folding area NFA1 and the second non-folding area NFA2 are areas in which the display device 10 is not folded. The first non-folding area NFA1 is disposed on one side, such as a right side of the folding area FDA. the second non-folding area NFA2 is disposed on the other side, such as a left side of the folding area FDA.

The touch sensing unit TSU according to an embodiment of the present disclosure is disposed on the first non-folding area NFA1 and the second non-folding area NFA2, respectively.

The folding area FDA can be bent with a predetermined curvature at the first folding line FOL1 and the second folding line FOL2. Therefore, the first folding line FOL1 is a boundary between the folding area FDA and the first non-folding area NFA1, and the second folding line FOL2 is a boundary between the folding area FDA and the second non-folding area NFA2.

A first folding line FOL1 and a second folding line FOL2 extend in the second direction (Y-axis direction), and the display device 10 can be folded in the first direction (X-axis direction) about the first folding line FOL1 and the second folding line FOL2. Accordingly, since a length of the display device 10 in the first direction (X-axis direction) is reduced by about half, it may be more convenient for a user to carry the display device 10.

Figure 20:
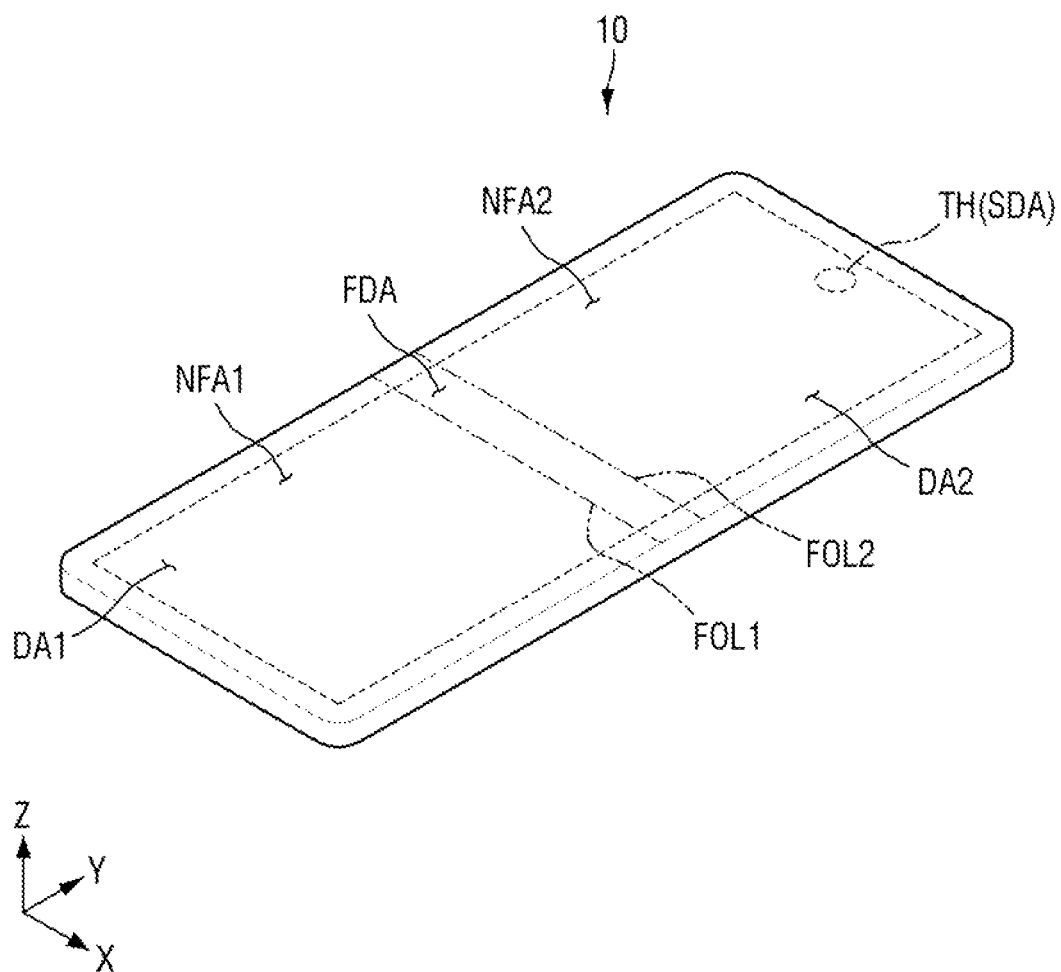
FIGS. 20 and 21 are perspective views of a display device according to an embodiment of the present disclosure.
Figure 21:
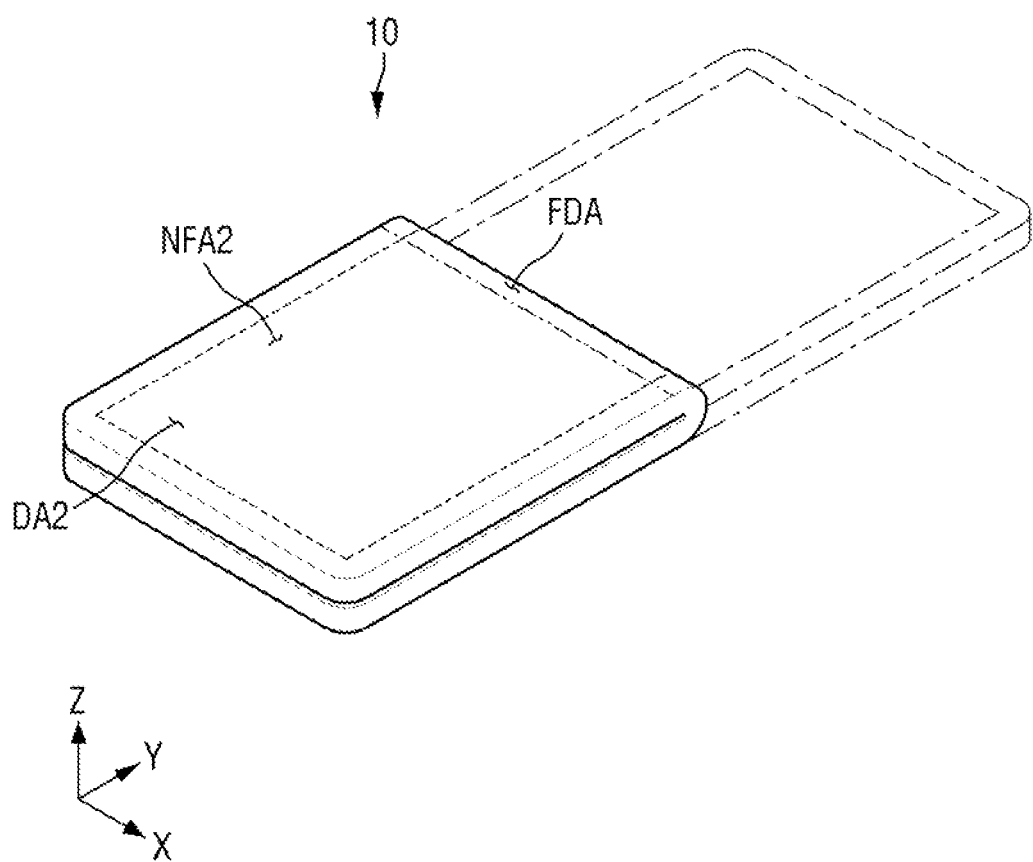

However, the extension direction of the first folding line FOL1 and the extension direction of the second folding line FOL2 are not necessarily limited to the second direction (Y-axis direction). For example, in an embodiment, as illustrated in FIGS. 20 and 21, the first folding line FOL1 and the second folding line FOL2 extend in the first direction (X-axis direction), and the display device 10 can be folded in the second direction (Y-axis direction). A length of the display device 10 in the second direction (the Y-axis direction) can be reduced by about half. In an embodiment, the first folding line FOL1 and the second folding line FOL2 extend in a diagonal direction between the first direction (X-axis direction) and the second direction (Y-axis direction) of the display device 10. The display device 10 folds in a triangular shape.

When the first folding line FOL1 and the second folding line FOL2 extend in the second direction (Y-axis direction), a length of the folding area FDA in the first direction (X-axis direction) is less than a length thereof in the second direction (Y-axis direction). In addition, a length of the first non-folding area NFA1 in the first direction (X-axis direction) is greater than the length of the folding area FDA in the first direction (X-axis direction). A length of the second non-folding area NFA2 in the first direction (X-axis direction) is greater than the length of the folding area FDA in the first direction (X-axis direction).

A first display area DA1 is disposed on the front surface of the display device 10. The first display area DA1 overlaps the folding area FDA, the first non-folding area NFA1, and the second non-folding area NFA2. Therefore, when the display device 10 is unfolded, an image can be displayed in a front direction in the folding area FDA, the first non-folding area NFA1, and the second non-folding area NFA2 of the display device 10.

A second display area DA2 is disposed on the rear surface of the display device 10. The second display area DA2 overlaps the second non-folding area NFA2. Therefore, when the display device 10 is folded, an image can be displayed in the front direction in the second non-folding area NFA2 of the display device 10.

FIGS. 18 and 19 illustrate a through hole TH disposed in the first non-folding area NFA1 in which a camera SDA is formed, but embodiments of the present disclosure are not necessarily limited thereto. In embodiments, the through hole TH or the camera SDA may be disposed in the second non-folding area NFA2 or the folding area FDA.

FIGS. 20 and 21 are perspective views of a display device according to an embodiment of the present disclosure.

According to an embodiment, FIGS. 20 and 21 illustrate that the display device 10 is a foldable display device that is folded in the second direction (Y-axis direction). The display device 10 can maintain both a folded state and an unfolded state. The display device 10 can be folded in an in-folding manner in which a front surface thereof is disposed inside. When the display device 10 is bent or folded in an in-folding manner, the front surfaces of the display device 10 face each other. Alternatively, the display device 10 can be folded in an out-folding manner in which the front surface thereof is disposed on the outside. When the display device 10 is bent or folded in an out-folding manner, the rear surfaces of the display device 10 face each other.

The display device 10 includes a folding area FDA, a first non-folding area NFA1, and a second non-folding area NFA2. The folding area FDA is where the display device 10 is folded, and the first non-folding area NFA1 and the second non-folding area NFA2 are areas in which the display device 10 is not folded. The first non-folding area NFA1 is disposed on one side, such as a lower side of the folding area FDA. The second non-folding area NFA2 is disposed on the other side, such as an upper side of the folding area FDA.

The touch sensing unit TSU according to an embodiment of the present specification is formed and disposed on the first non-folding area NFA1 and the second non-folding area NFA2, respectively.

The folding area FDA can be bent with a predetermined curvature at the first folding line FOL1 and the second folding line FOL2. Therefore, the first folding line FOL1 is a boundary between the folding area FDA and the first non-folding area NFA1, and the second folding line FOL2 is a boundary between the folding area FDA and the second non-folding area NFA2.

As illustrated in FIGS. 20 and 21, the first folding line FOL1 and the second folding line FOL2 extend in the first direction (X-axis direction), and the display device 10 can be folded in the second direction (Y-axis direction). Accordingly, since a length of the display device 10 in the second direction (Y-axis direction) is reduced by about half, it may be more convenient for a user to carry the display device 10.

However, the extension direction of the first folding line FOL1 and the extension direction of the second folding line FOL2 are not necessarily limited to the first direction (X-axis direction). For example, in an embodiment, as illustrated in FIGS. 18 and 19, the first folding line FOL1 and the second folding line FOL2 extend in the second direction (Y-axis direction), and the display device 10 can be folded in the first direction (X-axis direction). A length of the display device 10 in the first direction (the X-axis direction) is reduced by about half. In an embodiment, the first folding line FOL1 and the second folding line FOL2 extend in a diagonal direction between the first direction (X-axis direction) and the second direction (Y-axis direction) of the display device 10. The display device 10 folds in a triangular shape.

When the first folding line FOL1 and the second folding line FOL2 extend in the first direction (X-axis direction) as illustrated in FIGS. 20 and 21, a length of the folding area FDA in the second direction (Y-axis direction) is less than a length thereof in the first direction (X-axis direction). In addition, a length of the first non-folding area NFA1 in the second direction (Y-axis direction) is greater than the length of the folding area FDA in the second direction (Y-axis direction). In addition, a length of the second non-folding area NFA2 in the second direction (Y-axis direction) is greater than the length of the folding area FDA in the second direction (Y-axis direction).

A first display area DA1 is disposed on the front surface of the display device 10. The first display area DA1 overlaps the folding area FDA, the first non-folding area NFA1, and the second non-folding area NFA2. Therefore, when the display device 10 is unfolded, an image can be displayed in a front direction in the folding area FDA, the first non-folding area NFA1, and the second non-folding area NFA2 of the display device 10.

A second display area DA2 is disposed on the rear surface of the display device 10. The second display area DA2 overlaps the second non-folding area NFA2. Therefore, when the display device 10 is folded, an image can be displayed in the front direction in the second non-folding area NFA2 of the display device 10.

FIGS. 20 and 21 illustrate a through hole TH formed in the second non-folding area NFA2 in which a camera SDA is disposed, but embodiments of the present disclosure are not necessarily limited thereto. In embodiments, the through hole TH may be disposed in the first non-folding area NFA1 or the folding area FDA.

In concluding the detailed description, those skilled in the art will appreciate that many variations and modifications can be made to embodiments without substantially departing from the principles of the inventive concept. Therefore, embodiments of the disclosure are used in a generic and descriptive sense only and not for purposes of limitation.

What is claimed is:

1. A display device, comprising:
a display unit that includes a plurality of light emitting areas;
a plurality of touch electrodes that capacitively sense a touch and are disposed on the display unit between the plurality of light emitting areas;
a plurality of code patterns that cover a portion of a front surface of at least one of the plurality of touch electrodes with a preset code shape; and
an infrared scattering layer disposed on the plurality of touch electrodes and the plurality of code patterns according to an arrangement shape of the plurality of touch electrodes, wherein the infrared scattering layer scatters infrared light incident on or reflected from the plurality of code patterns and the plurality of touch electrodes, wherein the infrared scattering layer covers the plurality of touch electrodes, the plurality of code patterns and at least one light emitting area of the plurality of light emitting areas.

2. The display device of claim 1, wherein
the plurality of touch electrodes include a plurality of driving electrodes, a plurality of sensing electrodes, and a plurality of dummy electrodes, and
the plurality of driving electrodes, the plurality of sensing electrodes, and the plurality of dummy electrodes have a mesh structure that surrounds the plurality of light emitting areas.

3. The display device of claim 1, wherein the plurality of code patterns have a planar shape that is one of a closed loop shape of at least one of a rectangle, a square, a circle, or a rhombus, an open loop shape that partially surrounds at least one of the plurality of light emitting areas, or a straight line shape that has a preset length.

4. The display device of claim 1, wherein the plurality of code patterns include an inorganic or organic black pigment that absorbs infrared light, and cover a portion of a front surface and a portion of a side surface of at least one of the plurality of touch electrodes.

5. The display device of claim 1, wherein the infrared scattering layer has a straight or curved pattern shape that partially covers front and side surfaces of the plurality of touch electrodes and the plurality of code patterns, or has an open loop shape that partially surrounds at least one light emitting area of the plurality of light emitting areas.

6. The display device of claim 1, wherein the infrared scattering layer has a mesh shape that covers front and side surfaces of the plurality of touch electrodes and the plurality of code patterns according to a planar arrangement shape of the plurality of touch electrodes.

7. The display device of claim 1, wherein the infrared scattering layer has a planar shape that covers all of the plurality of touch electrodes, the plurality of code patterns, and the plurality of light emitting areas.

8. The display device of claim 1,
wherein the plurality of light emitting areas emit first to third colors, and wherein the infrared scattering layer covers the plurality of touch electrodes, the plurality of code patterns, and light emitting areas that emit second and third colors of the plurality of light emitting areas.

9. The display device of claim 1,
wherein the plurality of light emitting areas emit first to third colors, and
wherein the infrared scattering layer covers the plurality of touch electrodes, the plurality of code patterns, and a light emitting area that emits a third color of the plurality of light emitting areas.

10. The display device of claim 1,
wherein the plurality of light emitting areas emit first to fourth colors, and
wherein the infrared scattering layer covers the plurality of touch electrodes, the plurality of code patterns, and light emitting areas that emit second to fourth colors of the plurality of light emitting areas.

11. The display device of claim 1,
wherein the plurality of light emitting areas emit first to fourth colors, and
wherein the infrared scattering layer covers the plurality of touch electrodes, the plurality of code patterns, and light emitting areas that emit third and fourth colors of the plurality of light emitting areas.

12. The display device of claim 1, wherein
the infrared scattering layer is formed of an organic or inorganic material that includes a plurality of infrared scatterers, and
the infrared scatterers include particles that have a size that transmits light of a preset visible light wavelength band and reflects and scatters light of a preset infrared wavelength band according to an experimental value.

13. The display device of claim 12, wherein the infrared scattering layer includes spherical and elliptical metal nanoparticles whose diameters are configured to reflect and scatter light of the preset infrared wavelength band.

14. The display device of claim 12, wherein the infrared scattering layer includes spherical and elliptical metal nanoparticles whose diameters are configured to scatter light of the preset infrared wavelength band and transmit light of the preset visible light wavelength band.

15. The display device of claim 12, wherein the infrared scattering layer further includes rod-shaped metal nanoparticles whose length-to-width ratio is configured to scatter light of the preset infrared wavelength band.

16. A touch input system, comprising:
a display device that displays an image; and
a touch input device that inputs a touch to the display device,
wherein the display device includes:
a display unit that includes a plurality of light emitting areas;
a plurality of touch electrodes that capacitively sense a touch and are disposed between the plurality of light emitting areas; and
a plurality of code patterns that cover a portion of a front surface of at least one of the plurality of touch electrodes with a preset code shape; and
wherein the touch input device includes:
a code detection unit that senses the plurality of code patterns; and
a code processor that receives shape data for the plurality of code patterns and extracts data codes that correspond to shapes of the plurality of code patterns, and that generates coordinate data that correspond to the data codes,
wherein the infrared scattering layer has that covers the plurality of touch electrodes, the plurality of code patterns and at least one light emitting area of the plurality of light emitting areas.

17. The touch input system of claim 16,
wherein the display device includes an infrared scattering layer disposed on the plurality of touch electrodes and the plurality of code patterns according to an arrangement shape of the plurality of touch electrodes to scatter infrared light incident on or reflected from the plurality of code patterns and the plurality of touch electrodes; and
wherein the touch input device includes a communication module that transmits the coordinate data to the display device.

18. The touch input system of claim 16, wherein
the plurality of touch electrodes include a plurality of driving electrodes, a plurality of sensing electrodes, and a plurality of dummy electrodes, and
the plurality of driving electrodes, the plurality of sensing electrodes, and the plurality of dummy electrodes have a mesh structure that surrounds the plurality of light emitting areas.

19. The touch input system of claim 17, wherein the infrared scattering layer has a mesh shape that covers front and side surfaces of the plurality of touch electrodes and the plurality of code patterns according to a planar arrangement shape of the plurality of touch electrodes.

20. The touch input system of claim 17,
wherein the plurality of light emitting areas include first to third light emitting areas that respectively emit first to third colors, or first to fourth light emitting areas that respectively emit first to fourth colors, and
wherein the infrared scattering layer covers the plurality of touch electrodes, the plurality of code patterns, and at least one light emitting area of the first to third light emitting areas or the first to fourth light emitting areas.

* * * * *